(12) United States Patent
Nakagawa et al.

(10) Patent No.: US 8,462,200 B2
(45) Date of Patent: Jun. 11, 2013

(54) IMAGE PROCESSING APPARATUS, IMAGE DISPLAY APPARATUS AND IMAGE DISPLAY SYSTEM

(75) Inventors: Makoto Nakagawa, Tokyo (JP); Yuji Nakahata, Kanagawa (JP)

(73) Assignee: Sony Corporation (JP)

( * ) Notice: Subject to any disclaimer, the term of this patent is extended or adjusted under 35 U.S.C. 154(b) by 413 days.

(21) Appl. No.: 12/800,338

(22) Filed: May 13, 2010

(65) Prior Publication Data
US 2010/0309381 A1 Dec. 9, 2010

(30) Foreign Application Priority Data

Jun. 5, 2009 (JP) ................ P2009-136354

(51) Int. Cl.
*H04N 9/47* (2006.01)
(52) U.S. Cl.
USPC ............................................................ 348/55
(58) Field of Classification Search
USPC ............................................................ 348/55
See application file for complete search history.

(56) References Cited

U.S. PATENT DOCUMENTS

| | | | | |
|---|---|---|---|---|
| 5,669,814 | A * | 9/1997 | Takeda ........................... | 454/187 |
| 8,013,918 | B2 * | 9/2011 | Kamon et al. ................ | 348/308 |
| 2005/0068343 | A1 | 3/2005 | Pan et al. | |
| 2005/0200631 | A1 | 9/2005 | Pan et al. | |
| 2005/0280611 | A1 * | 12/2005 | Abe et al. ...................... | 345/74.1 |
| 2006/0114317 | A1 * | 6/2006 | Yuuki et al. ..................... | 348/51 |
| 2009/0051694 | A1 | 2/2009 | Pan et al. | |

FOREIGN PATENT DOCUMENTS

| | | |
|---|---|---|
| JP | 09-138384 A | 5/1997 |
| JP | 2000-036969 A | 2/2000 |
| JP | 2001-318363 A | 11/2001 |
| JP | 2003-045343 A | 2/2003 |
| JP | 2004-246312 A | 9/2004 |
| JP | 2005-107531 A | 4/2005 |
| JP | 2006157775 A | 6/2006 |
| JP | 2006267653 A | 10/2006 |
| JP | 2009-025436 A | 2/2009 |
| JP | 2009232249 A | 10/2009 |
| JP | 2009237323 A | 10/2009 |
| WO | 2008146424 A1 | 12/2008 |

OTHER PUBLICATIONS

Office Action from Japanese Application No. 2009-136354, dated Oct. 31, 2012.

* cited by examiner

*Primary Examiner* — David Czekaj
*Assistant Examiner* — Tracy Li
(74) *Attorney, Agent, or Firm* — Lerner, David, Littenberg, Krumholz & Mentlik, LLP

(57) ABSTRACT

Disclosed herein is a video-image processing apparatus including: a video-image processing section configured to execute output control on video-image streams each including unitary video images appearing along the time axis so as to output every unitary video image pertaining to each of the video-image streams repeatedly a plurality of times by sequentially switching the video-image streams to be output on a time-division basis; a frame memory for temporarily storing an immediately preceding unitary video image as it is or after replacing the luminance gradation of the immediately preceding unitary video image with a post-replacement luminance gradation where the immediately preceding unitary video image is defined as a unitary video image which immediately leads ahead of a current unitary video image being output by the video-image processing section and is selected; and an overdrive processing section configured to carry out overdrive processing on the current unitary video image.

10 Claims, 13 Drawing Sheets

LUT1

| | D2 GRADATION | | | | |
|---|---|---|---|---|---|
| | 0 | 64 | 128 | 192 | 255 |
| 0 | 0 | 0 | 0 | 0 | 0 |
| 64 | 165 | 64 | 19 | 9 | 0 |
| 128 | 210 | 174 | 128 | 88 | 41 |
| 192 | 236 | 225 | 210 | 192 | 168 |
| 255 | 255 | 255 | 255 | 255 | 255 |

D1 GRADATION (left axis) ← D3 GRADATION

LUT2

| | D2 GRADATION | | | | |
|---|---|---|---|---|---|
| | 0 | 64 | 128 | 192 | 255 |
| 0 | 0 | 0 | 0 | 0 | 0 |
| 64 | 75 | 64 | 61 | 60 | 45 |
| 128 | 143 | 136 | 128 | 123 | 116 |
| 192 | 202 | 198 | 195 | 192 | 188 |
| 255 | 255 | 255 | 255 | 255 | 255 |

D1 GRADATION (left axis) ← D3 GRADATION

IMAGE WRITE/DISPLAY

SHUTTER-GLASSES STATES

IMAGE WRITE/DISPLAY

SHUTTER-GLASSES STATES

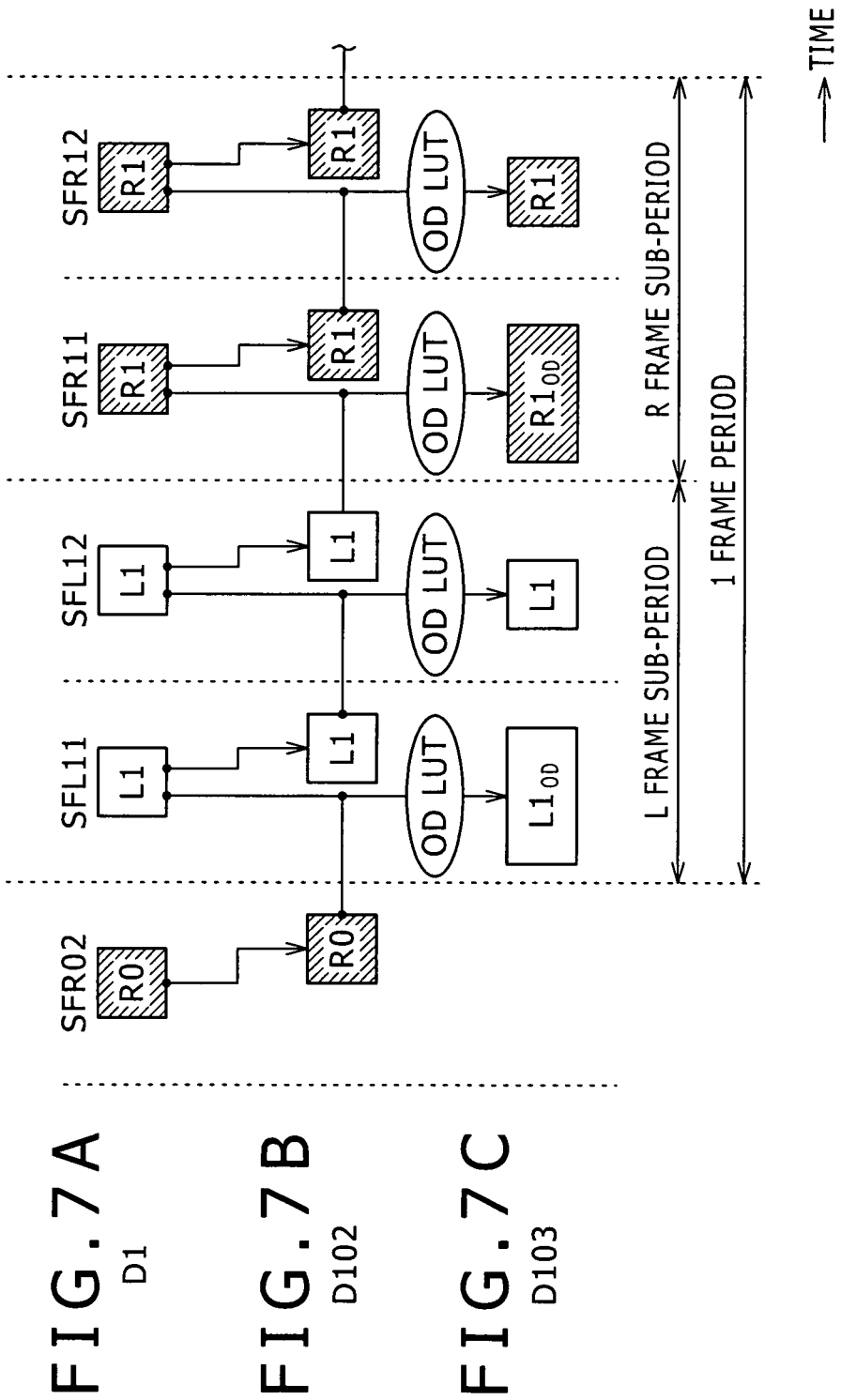

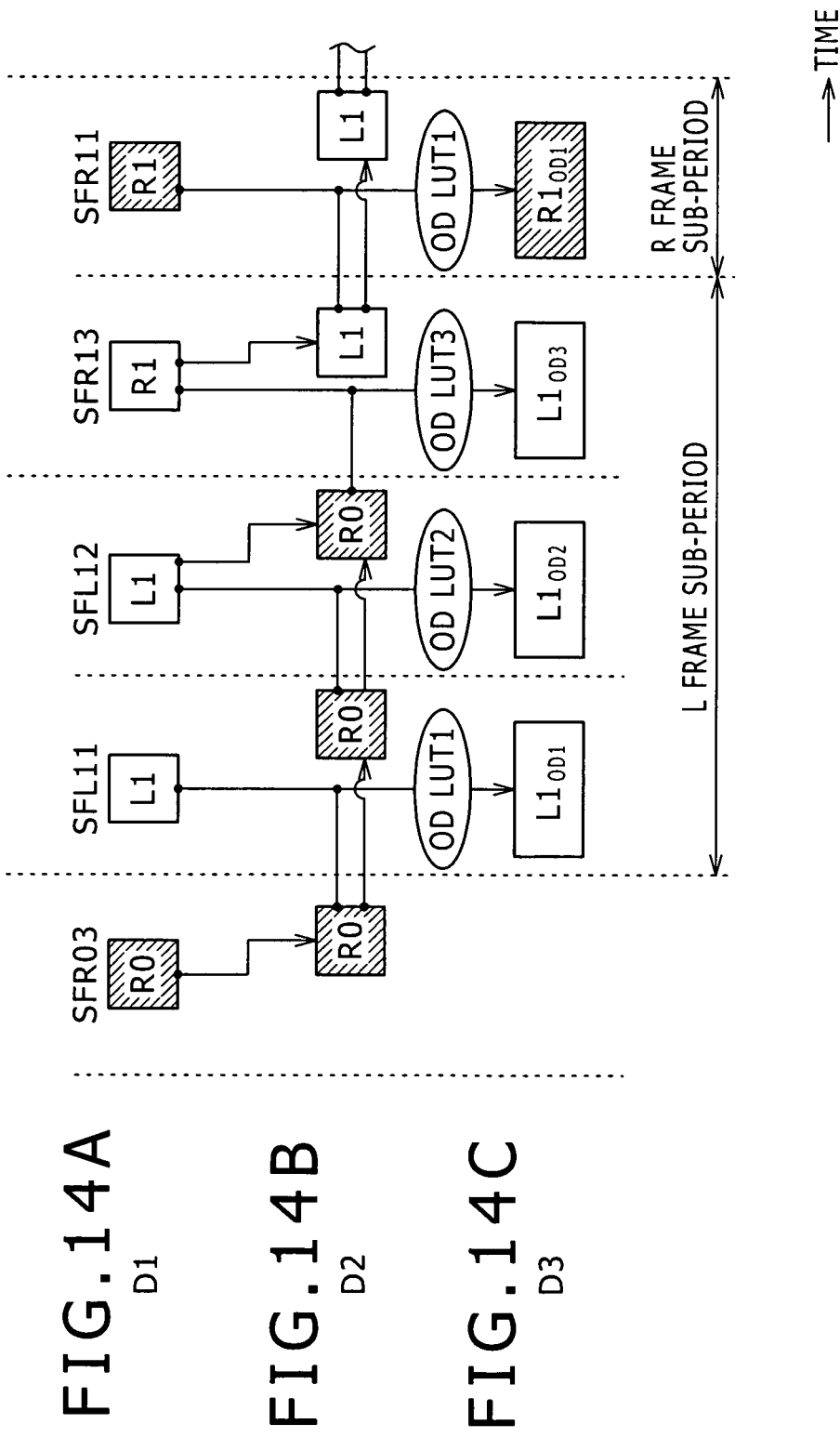

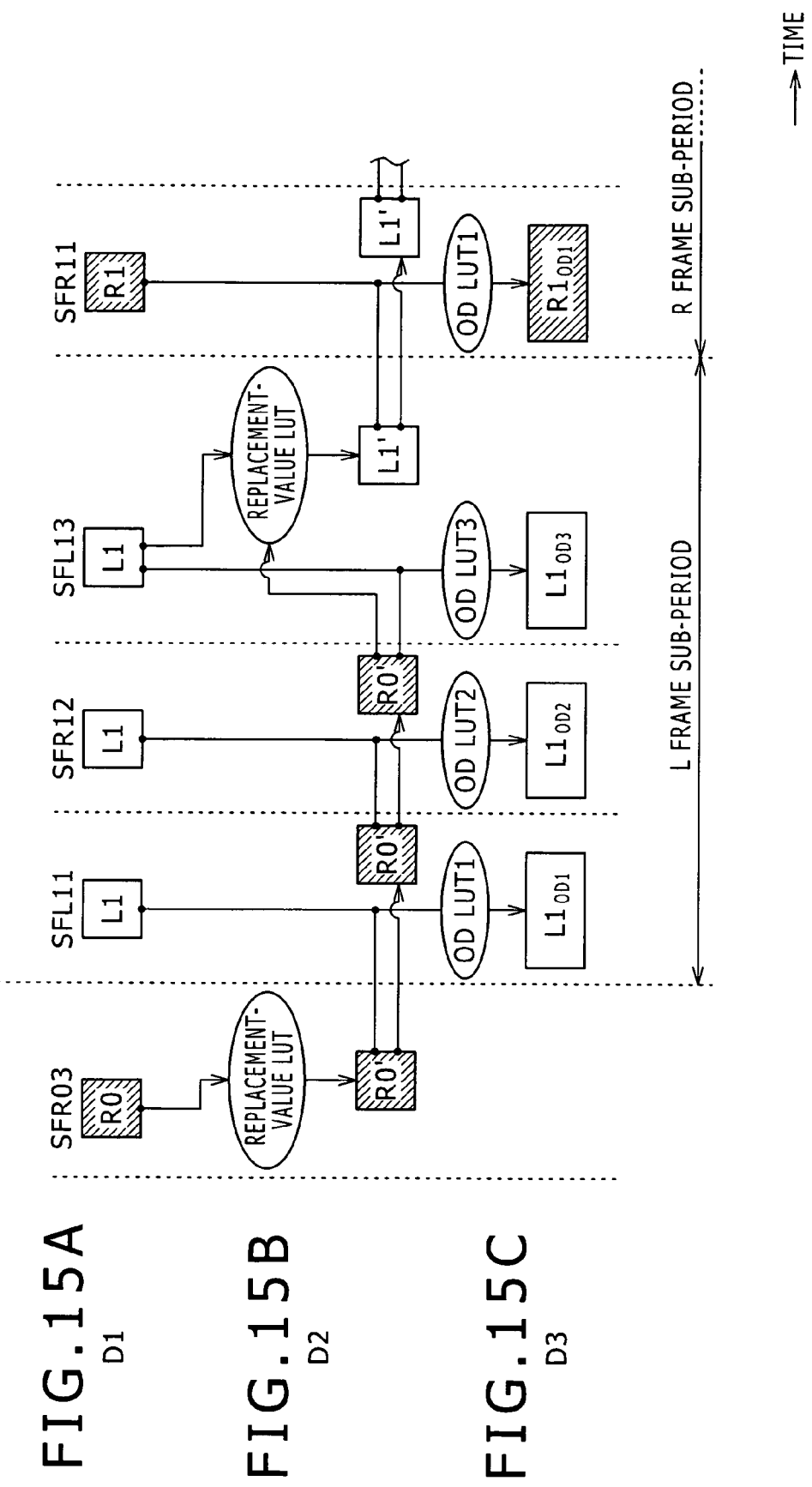

IMAGE PROCESSING APPARATUS, IMAGE DISPLAY APPARATUS AND IMAGE DISPLAY SYSTEM

CROSS-REFERENCE TO RELATED APPLICATION

The present application claims priority from Japanese Patent Application No. JP 2009-136354 filed in the Japanese Patent Office on Jun. 5, 2009, the entire content of which is incorporated herein by reference.

BACKGROUND OF THE INVENTION

1. Field of the Invention

The present invention relates to a video-image processing apparatus for carrying out overdrive processing on an input video-image signal, a video-image display apparatus employing the video-image processing apparatus and a video-image display system including the video-image display apparatus.

2. Description of the Related Art

In recent years, an LCD (Liquid Crystal Display) apparatus of the active-matrix type is used widely as the image display section of a thin TV or the image display section of a portable terminal. The LCD apparatus employs a TFT (Thin Film Transistor) for each pixel of the LCD apparatus. Pixels employed in such an LCD apparatus are arranged to form a matrix including rows on the display screen of the LCD apparatus. In general, every pixel is driven by writing a video-image signal sequentially on a row-after-row basis into an auxiliary capacitor and a liquid-crystal device which are employed in the pixel in a direction from the top of the display screen to the bottom thereof.

By the way, depending on the application of the LCD apparatus, one frame period is divided into a number of sub-periods and the LCD apparatus is driven in a driving operation referred to hereafter as a time-division driving operation in order to display a video image which varies from sub-period to sub-period. A method adopted to carry out a time-division driving operation is referred to as a time-division driving method. Typical examples of an LCD apparatus adopting the time-division driving method are an LCD apparatus disclosed in documents such as Japanese Patent Laid-Open No. 2001-318363 in which a field sequential method is adopted and a 3D (3 Dimensional) image display system disclosed in documents such as Japanese Patent Laid-Open Nos. Hei 9-138384, 2000-36969 and 2003-45343 in which the so-called shutter glasses are used.

The field sequential method is a driving method, in accordance with which one frame period is divided into three frame sub-periods allocated to operations to sequentially write R (red), G (green) and B (blue) video-image signals respectively into pixels. In addition, in accordance with the field sequential method, the R, G and B light rays are emitted from a backlight synchronously with the R, G and B video-image signals respectively. In an ordinary LCD apparatus, a pixel is generally divided into R, G and B sub-pixels which are laid out spatially. Thus, the efficiency of the utilization of light is poor. By adopting the field sequential driving method, however, the efficiency of the utilization of light can be improved.

In the 3D image display system making use of shutter glasses, on the other hand, one frame period is divided into two frame sub-periods allocated to operations to alternately display two video images provided for the left and right eyes respectively as images having a disparity recognized by the left and right eyes. The 3D image display system makes use of shutter glasses which are switched to close the left eye and open the right eye and vice versa synchronously with the operations to alternately display the two video images provided for the left and right eyes. The viewer views a displayed image by wearing the switched shutter glasses which allow the image to be seen by the viewer as a 3D image.

SUMMARY OF THE INVENTION

In some cases, however, in an LCD apparatus adopting any of the time-division driving methods described above, consecutive video images are inadvertently mixed with each other in a phenomenon referred to as an interference or crosstalk. If crosstalk occurs, the color of an image displayed on a screen in accordance with the field sequential method appears differently from the true one. If crosstalk occurs in the 3D image display system making use of shutter glasses, on the other hand, at the top of the display screen and/or the bottom thereof, the right-hand side portion of an image displayed on the screen is seen by the left eye whereas the left-hand side portion of the displayed image is seen by the right eye or vice versa so that the correct 3D video image can hardly be recognized. In general, in the time-division driving method, every pixel is driven in by writing a video-image signal sequentially on a row-after-row basis into the pixel in a direction from the top of the display screen to the bottom thereof. As a result, much crosstalk occurs at the top and bottom of the display screen.

Such crosstalk is generated because of poor characteristics of the LCD apparatus and/or poor characteristics of shutter glasses which are each provided with a light shielding shutter. Poor characteristics of the LCD apparatus include an inadequate response speed of the apparatus whereas poor characteristics of shutter glasses include insufficient shutter contrasts.

In order to solve the problems described above, a continuous writing method has been conceived. In accordance with this continuous writing method, first of all, a video-image signal is written into pixels continuously within one frame period in units each including a plurality of unitary video images in an operation to continuously write the video-image signal into the pixels. Then, during a period in which a desired luminance level is sustained by virtue of sufficient responses provided by liquid-crystal devices included in the pixels to the operation to continuously write the video-image signal into the pixels, the backlight is turned on and a light shielding shutter employed in the shutter glasses is put in an open state to be described more later. Thus, the backlight can be turned on or the light shielding shutter can be put in an open state only during a period in which the same video image is being displayed on the entire screen. As a result, crosstalk can be conceivably suppressed.

In addition, in order to compensate the LCD apparatus for the inadequate response speed of liquid-crystal devices employed in the apparatus, overdrive processing has been proposed in the past. For more information on the overdrive processing, the reader is suggested to refer to documents such as Japanese Patent Laid-Open No. 2005-107531. During an operation to display a video image in accordance with the time-division driving method such any of the ones described above, a plurality of video images are always displayed repeatedly so that the liquid-crystal devices never get settled in a steady state in many cases. Thus, if the existing overdrive processing premising a transition from the steady state is applied as it is to a video-image display operation carried out by adoption of the time-division driving method, the optimum level of an applied voltage cannot be obtained so that a shift from target luminance is inevitably resulted in. As a result, crosstalk is undesirably generated.

In addition, if the existing overdrive processing is applied as it is to a video-image display operation carried out by adoption of the continuous writing method, for every continuous writing operation, overdrive processing is carried out always in accordance with the luminance gradation of the current unitary video image and the luminance gradation of a unitary video image immediately leading ahead of the current unitary video image regardless of whether or not the current unitary video image and the unitary video image immediately leading ahead of the current unitary video image are the same video image or pertain to the same video-image stream. Thus, since the function of the overdrive processing cannot be executed fully, a shift from target luminance is resulted in similarly. As a result, crosstalk is undesirably generated.

As described above, in accordance with the existing techniques, in an operation to display a video image by adoption of the time-division driving method, it is not possible to avoid generation of crosstalk among a plurality of successive video images. Thus, implementation of an improved technique is desirable. It is to be noted that the problems each described so far as a problem of crosstalk are raised not only by an LCD apparatus. That is to say, the crosstalk problems can also be raised by a video-image display apparatus of another kind.

Addressing the problems described above, inventors of the present invention have innovated a video-image processing apparatus capable of eliminating crosstalk which appears as interferences among a plurality of successive video images. The inventors have also innovated a video-image display apparatus employing the video-image processing apparatus and a video-image display system including the video-image display apparatus.

A video-image processing apparatus according to an embodiment of the present invention includes:

a video-image processing section configured to execute output control on a plurality of video-image streams each including a plurality of unitary video images appearing along the time axis so as to output every unitary video image pertaining to each of the video-image streams repeatedly a plurality of times in a row by sequentially switching the video-image streams to be output from one stream to another on a time-division basis;

a frame memory for temporarily storing an immediately preceding unitary video image as it is or after replacing the luminance gradation of the immediately preceding unitary video image with a post-replacement luminance gradation where the immediately preceding unitary video image is defined as a unitary video image which immediately leads ahead of a current unitary video image being output by the video-image processing section and is selected among unitary video images pertaining to a video-image stream other than and different from a video-image stream including the current unitary video image; and an overdrive processing section configured to carry out overdrive processing on the current unitary video image in accordance with the luminance gradation of the immediately preceding unitary video image already stored in the frame memory and the luminance gradation of the current unitary video image.

The technical term "video-image stream" used in the above description means a sequence of unitary video images consecutively appearing on the time axis. Typical examples of the video-image stream are a left-eye video-image stream and a right-eye video-image stream which are output in an operation to display 3D video images. In the case of a video-image stream having a frequency of 60 Hz, for example, static video images are displayed continuously one image after another at a frequency of 60 Hz or a rate of 60 images per second. Each of the static images is referred to as the unitary video image mentioned above.

A video-image display apparatus according to an embodiment of the present invention employs the video-image processing apparatus provided by the embodiment of the present invention as described above and a video-image display section for displaying a video image on the basis of unitary video images completing the overdrive processing carried out by the video-image processing apparatus.

A video-image display system includes:

the video-image display apparatus provided by the embodiment of the present invention, for displaying a video image by sequentially switching a plurality of video-image streams each including a plurality of unitary video images appearing along the time axis from one stream to another on a time-division basis; and shutter glasses carrying out opening and closing operations synchronously with operations performed by the video-image display apparatus to sequentially switch the video-image streams in order to display the video image.

In the video-image processing apparatus, the video-image display apparatus and the video-image display system which are provided by embodiments of the present invention, the video-image processing section executes output control on a plurality of video-image streams each including a plurality of unitary video images appearing along the time axis so as to output every unitary video image pertaining to each of the video-image streams repeatedly a plurality of times in a row within a predetermined period of time by sequentially switching the video-image streams to be output from one stream to another on a time-division basis within the predetermined period of time.

In addition, the frame memory is used for temporarily storing an immediately preceding unitary video image as it is or after replacing the luminance gradation of the immediately preceding unitary video image with a post-replacement luminance gradation before the immediately preceding unitary video image is stored in the frame memory. In this case, the immediately preceding unitary video image is defined as a unitary video image which immediately leads ahead of a current unitary video image being output by the video-image processing section and is selected among unitary video images pertaining to a video-image stream other than and different from a video-image stream including the current unitary video image.

Then, the overdrive processing section carries out overdrive processing on the current unitary video image in accordance with the luminance gradation of the immediately preceding unitary video image already stored in the frame memory and the luminance gradation of the current unitary video image itself.

In the existing video-image display system, the overdrive processing is carried out to output unitary video images pertaining to each of the video-image streams consecutively in a predetermined period of time always in accordance with the luminance gradation of the current unitary video image and the luminance gradation of a unitary video image immediately leading ahead of the current unitary video image regardless of whether or not the current unitary video image and the unitary video image immediately leading ahead of the current unitary video image is the same unitary video image or pertain to the same video-image stream. Thus, in comparison with the existing video-image display system, according to the present invention, it is possible to reduce the magnitude of a shift of a display luminance based on unitary video images completing the overdrive processing from a target luminance.

In accordance with the video-image processing apparatus, the video-image display apparatus and the video-image display system which are provided by the present invention, the frame memory is used for temporarily storing an immediately preceding unitary video image as it is or after replacing the luminance gradation of the immediately preceding unitary video image with another gradation before the immediately preceding unitary video image is stored in the frame memory. In this case, the immediately preceding unitary video image is defined as a unitary video image which immediately leads ahead of a current unitary video image being output by the video-image processing section and is selected among unitary video images pertaining to a video-image stream other than and different from a video-image stream including the current unitary video image. Then, the overdrive processing section carries out overdrive processing on the current unitary video image in accordance with the luminance gradation of the immediately preceding unitary video image already stored in the frame memory and the luminance gradation of the current unitary video image itself. Thus, in comparison with the existing video-image display system, according to an embodiment of the present invention, it is possible to reduce the magnitude of a shift of a display luminance based on unitary video images completing the overdrive processing from a target luminance. As a result, it is possible to reduce crosstalk which appears as interferences among a plurality of consecutive unitary video images. It is to be noted that, as described above, in the existing video-image display system, the overdrive processing is carried out in order to output unitary video images pertaining to each of the video-image streams consecutively one image after another in a predetermined period of time always in accordance with the luminance gradation of the current unitary video image and the luminance gradation of a unitary video image immediately leading ahead of the current unitary video image regardless of whether or not the current unitary video image and the unitary video image immediately leading ahead of the current unitary video image pertain to the same video-image stream.

BRIEF DESCRIPTION OF THE DRAWINGS

FIGS. 7A to 7C are timing diagrams to be referred to in explanation of typical overdrive processing provided for a comparison purpose;

FIGS. 14A to 14C are timing diagrams to be referred to in explanation of overdrive processing carried out by a first modified version of the present invention;

FIGS. 15A to 15C are timing diagrams to be referred to in explanation of overdrive processing carried out by a second modified version of the present invention.

DETAILED DESCRIPTION OF THE PREFERRED INVENTION

Preferred embodiments of the present invention are described below in detail by referring to the diagrams. It is to be noted that the embodiments are explained in chapters which are arranged in the following order.

Figure 1:
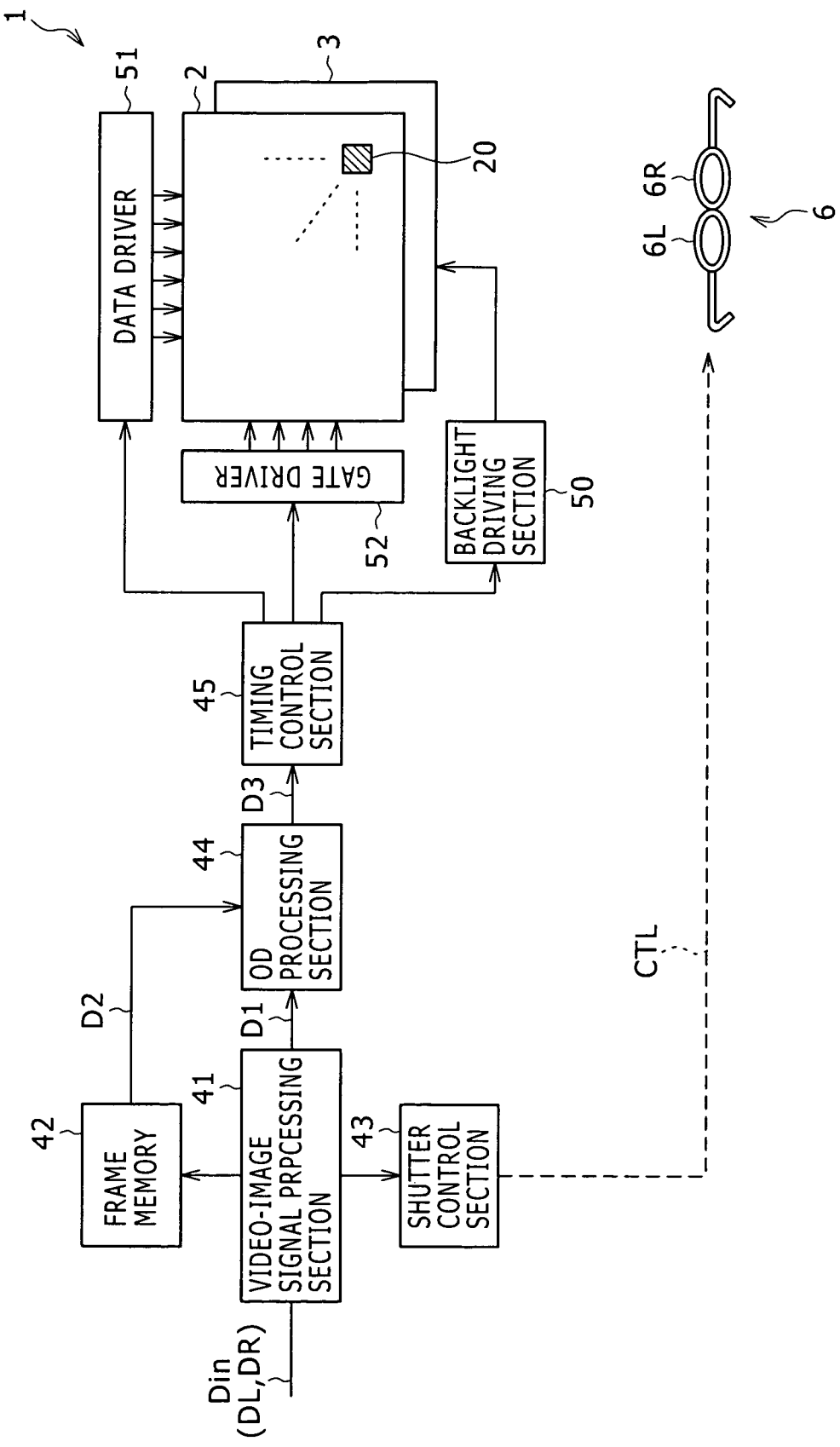
FIG. 1 is a block diagram showing the entire configuration of a video-image display system employing a video-image display apparatus according to a first embodiment of the present invention.

1: First Embodiment
(for displaying a 3D video image by using two overdrive-processing LUTs)
2: Second Embodiment
(for displaying a 3D video image by further using a replacement-value LUT)
3: Modified Versions
   3-1: First Modified Version (for displaying a 3D video image by using three overdrive-processing LUTs) and Second Modified Version (for displaying a 3D video image by further using a replacement-value LUT)
   3-2: Third Modified Version (application to a multi-video-image display system)
   3-3: Other Modified Versions 1: First Embodiment 1-1: Entire Configuration of a Video-Image Display System FIG. 1 is a block diagram showing the entire configuration of a video-image display system employing a video-image display apparatus according to a first embodiment of the present invention. The video-image display system is a video-image display system which adopts the time-division driving method. As shown in FIG. 1, the video-image display system employs a liquid-crystal display apparatus 1, which serves as the video-image display apparatus according to the first embodiment of the present invention and shutter glasses 6.

1-1-1: Liquid-Crystal Display Apparatus 1

The liquid-crystal display apparatus 1 is an apparatus for displaying a video image on the basis of an input video-image signal Din which includes a right-eye video-image signal DR serving as a video-image signal for the right eye and a left-eye video-image signal DL serving as a video-image signal for the left eye. The right-eye video-image signal DR represents video-image signals included in a video-image stream for the right eye whereas the left-eye video-image signal DL represents video-image signals included in a video-image stream for the left eye. The right-eye video-image signal DR and the left-eye video-image signal DL have a disparity.

As shown in FIG. 1, the liquid-crystal display apparatus 1 employs a liquid-crystal display panel 2, a backlight 3, a video-image signal processing section 41, a frame memory 42, a shutter control section 43, an overdrive processing section 44, a timing control section 45, a backlight driving section 50, a data driver 51 and a gate driver 52. The video-image signal processing section 41, the frame memory 42 and the overdrive processing section 44 together form a typical implementation of a video-image processing apparatus provided by the present invention.

The backlight 3 is a light source for radiating light to the liquid-crystal display panel 2. Typically, the backlight 3 is configured to include LEDs (Light Emitting Diodes) or CCFL (Cold Cathode Fluorescent Lamps).

In accordance with driving signals received from the gate driver 52 and on the basis of video-image voltages received from the data driver 51, the liquid-crystal display panel 2 modulates the light, which is radiated by the backlight 3 to the liquid-crystal display panel 2, in order to display a video image based on the input video-image signal Din. To put it more concretely, the liquid-crystal display panel 2 displays a right-eye video image based on the right-eye video-image signal DR and a left-eye video image based on the left-eye video-image signal DL alternately on a time-division basis as will be described later in detail. The right-eye video images based on the right-eye video-image signal DR are right-eye unitary video images pertaining to the video-image stream for the right eye whereas the left-eye video images based on the left-eye video-image signal DL are left-eye unitary video images pertaining to the video-image stream for the left eye. That is to say, a time-division driving operation to display a 3D video image is an operation carried out to display the 3D video image on the liquid-crystal display panel 2 in an output order controlled by the video-image signal processing section 41 to be explained later. The liquid-crystal display panel 2 is configured to include a plurality of pixels 20 which are all laid out to form a matrix. It is to be noted that a detailed configuration of the pixel 20 will be described by referring to a circuit diagram of FIG. 2.

The video-image signal processing section 41 controls the aforementioned output order (also referred to as a write order) of the right-eye video-image signal DR and the left-eye video-image signal DL in order to generate a video-image signal D1. To put it more concretely, the video-image signal processing section 41 controls the output order so that, while the video-image streams are being output by being sequentially switched from one stream to another on a time-division basis in one frame period, the right-eye video-image signal DR and the left-eye video-image signal DL each are output a plurality of times in a row during the frame period. In the case of the first embodiment, the right-eye video-image signal DR and the left-eye video-image signal DL are each output two times in a row during one frame period. To put it more concretely, in one frame period, the video-image signal processing section 41 produces the video-image signal D1 in accordance with the following order: a left-eye video-image signal DL→a left-eye video-image signal DL→a right-eye video-image signal DR→a right-eye video-image signal DR. In particular, a sub-period included in one frame period to serve as a sub-period allocated to an operation to output a left-eye video-image signal DL two times in a row is referred to as an L frame sub-period whereas a sub-period included in one frame period to serve as a sub-period allocated to an operation to output a right-eye video-image signal DR two times in a row is referred to as an R frame sub-period.

The frame memory 42 is a memory used for temporarily storing a video-image signal based on the input video-image signal Din. To put it more concretely, the frame memory 42 receives the signal of an immediately preceding unitary video image from the video-image signal processing section 41 and is used for storing the signal. The immediately preceding unitary video image is a unitary video image appearing in a frame sub-period which immediately leads ahead of the current frame sub-period. The frame memory 42 is used for storing the signal of the immediately preceding unitary video image as it is without processing the signal in the video-image signal processing section 41 during the frame sub-period which immediately leads ahead of the current frame sub-period.

To put it more concretely, for example, let the current frame sub-period be an L frame sub-period. In this case, a frame sub-period leading ahead of the current L frame sub-period is an R frame sub-period in. Thus, in the L frame sub-period serving as the current frame sub-period, the right-eye video-image signal DR appearing in the R frame sub-period is always selected and stored in the frame memory 42.

If the current frame sub-period is an R frame sub-period, on the other hand, a frame sub-period leading ahead of the current R frame sub-period is an L frame sub-period. Thus, in the R frame sub-period serving as the current frame sub-period, the left-eye video-image signal DL appearing in the L frame sub-period is always selected and stored in the frame memory 42.

It is to be noted that a variety of memories, for example, an SRAM (Static Random Access Memory) can be used as the frame memory 42.

The shutter control section 43 is a section for supplying a timing control signal CTL to the shutter glasses 6 to be described later in accordance with timing control executed by the video-image signal processing section 41. The control signal CTL is a signal for controlling operations of light shielding shutters employed in the shutter glasses 6 synchronously with timings to display video images for the left and right eyes. It is to be noted that, in the case of the first embodiment, the control signal CTL is typically a radio signal such as an infrared ray signal. However, the control signal CTL is by no means limited to a radio signal. For example, the control signal CTL can also be a wire signal.

The overdrive processing section 44 is a section for carrying out overdrive processing on a current unitary video-image signal D1 (a unitary video-image signal) in accordance with the luminance gradation of the immediately preceding unitary video-image signal D2 (also referred to as a stored unitary video-image signal) already stored in the frame memory 42 and the luminance gradation of the current unitary video-image signal D1 itself.

Each of the left-eye video-image signal DL and the right-eye video-image signal DR is output two times in a row in two consecutive write operations respectively. Every time a left-eye video-image signal DL or a right-eye video-image signal DR is output, the overdrive processing section 44 carries out overdrive processing on the left-eye video-image signal DL or the right-eye video-image signal DR by making use of the luminance gradation of the left-eye video-image signal DL or the right-eye video-image signal DR itself and making use of the luminance gradation of an immediately preceding video-image signal immediately leading ahead of the left-eye video-image signal DL or the right-eye video-image signal DR as a luminance gradation common to the left-eye video-image signal DL and the right-eye video-image signal DR or common to the two consecutive write operations. The immediately preceding video-image signal immediately leading ahead of the left-eye video-image signal DL or the right-eye video-image signal DR is a video-image signal pertaining to an immediately preceding video-signal stream other than and different from the current video-signal stream. The overdrive processing can be carried out in the current frame sub-period by making use of the luminance gradation of the immediately preceding video-image signal output during a video-image stream leading ahead of the current video-signal stream because the immediately preceding video-image signal has been stored in the frame memory 42 as explained before.

For example, let the current frame sub-period be an L frame sub-period which is further divided into first and second L frame sub-sub-periods. In this case, for the left-eye video-image signal DL output two times in a row during the first and second L frame sub-sub-periods of the current L frame sub-period, the overdrive processing section 44 carries out overdrive processing on the left-eye video-image signal DL output two times in a row during the first and second L frame sub-sub-periods by making use of the luminance gradation of an immediately preceding right-eye video-image signal DR output in the immediately preceding R frame sub-period immediately leading ahead of the current L frame sub-period as a luminance gradation common to the first and second L frame sub-sub-periods.

If the current frame sub-period is an R frame sub-period which is further divided into first and second R frame sub-sub-periods, on the other hand, for the right-eye video-image signal DR output two times in a row during the first and second R frame sub-sub-periods of the current R frame sub-period, the overdrive processing section 44 carries out overdrive processing on the right-eye video-image signal DR output two times in a row during the first and second R frame sub-sub-periods by making use of the luminance gradation of an immediately preceding left-eye video-image signal DL output in the immediately preceding L frame sub-period immediately leading ahead of the current R frame sub-period as a luminance gradation common to the first and second R frame sub-sub-periods.

Every time a video-image signal included in the video-image signal D1 is output two times in a row during first and second frame sub-sub-periods as described above, in the overdrive processing, the overdrive processing section 44 makes use of two different LUTs (Look-Up Tables) each prescribing overdrive quantities for the first and second frame sub-sub-periods respectively. That is to say, when the video-image signal included in the video-image signal D1 is output to (written into) pixels during the first frame sub-sub-period, the overdrive processing section 44 refers to the first LUT in order to find a first overdrive quantity by making use of the luminance gradation common to the first and second frame sub-sub-periods. When the video-image signal included in the video-image signal D1 is output to (written into) pixels during the second frame sub-sub-period, on the other hand, the overdrive processing section 44 refers to the second LUT different from the first LUT in order to find a second overdrive quantity, which is different from the first overdrive quantity, also by making use of the luminance gradation common to the first and second frame sub-sub-periods. The two LUTs are each used for prescribing overdrive quantities set in accordance with the luminance gradations of the video-image signal D1 and the immediately preceding video-image signal D2 which have been described before. An overdrive quantity prescribed in such an LUT is used as the luminance gradation of a video-image signal D3 which is a video-image signal obtained as a result of the overdrive processing. It is to be noted that the detailed configurations of the first and second LUTs will be explained later by referring to FIGS. 3A and 3B.

The timing control section 45 is a section for controlling driving timings of the backlight driving section 50, the gate driver 52 and the data driver 51 as well as a section for passing on the video-image signal D3 received from the overdrive processing section 44 to the data driver 51.

In accordance with the timing control executed by the timing control section 45, the gate driver 52 drives pixels 20 included in the liquid-crystal display panel 2 provided along each of scan lines each forming a row of the pixel matrix sequentially on a row-after-row basis. The scan line not shown in FIG. 1 is referred to as a gate line G to be described later.

The data driver 51 is a section for supplying a video-image voltage based on the video-image signal D3 received from the timing control section 45 to each of the pixels 20 employed in the liquid-crystal display panel 2. To put it more concretely, the data driver 51 carries out a D/A process of converting the digital video-image signal D3 into an analog video-image signal which is the video-image voltage mentioned above and outputs the analog video-image signal to the pixels 20.

The backlight driving section 51 is a section for controlling turning-on and turning-off operations of the backlight 3 in accordance with the timing control executed by the timing control section 45.

1-1-2: Shutter Glasses 6

The viewer of the liquid-crystal display apparatus 1 wears the shutter glasses 6 in order to view a 3D image which is appearing on the display screen. The shutter glasses 6 are configured to include a left-eye lens 6L and a right-eye lens 6R.

Each of the left-eye lens 6L and the right-eye lens 6R is provided with a light shielding shutter such as a liquid-crystal shutter which is also not shown in FIG. 1. The function of each of the light shielding shutters can be put in an effective state which is defined as a close state of the shutter or an ineffective state which is defined as an open state of the shutter. The light shielding shutter is arbitrarily controlled by the control signal CTL generated by the shutter control section 43 to enter the close or open state. To put it more concretely, the shutter glasses 6 carry out operations to enter the close or open state synchronously with operations carried out by the liquid-crystal display apparatus 1 to switch a plurality of video images from one image to another as will be explained later in detail.

1-1-3: Detailed Configuration of the Pixel

Figures 2, 3A, 3B:
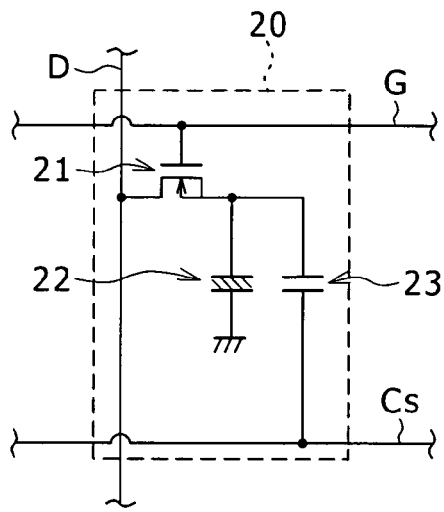
FIG. 2 is a circuit diagram showing details of a typical configuration of every pixel employed in the video-image display apparatus shown in FIG. 1.
FIGS. 3A and 3B are model diagrams each showing a typical LUT (Look-Up Table) used in overdrive processing.

Next, a detailed configuration of every pixel 20 is explained by referring to a circuit diagram of FIG. 2. FIG. 2 is a circuit diagram showing details of a typical configuration of every pixel 20.

As shown in FIG. 2, the pixel 20 employs a liquid-crystal device 22, a TFT (Thin Film Transistor) device 21 and an auxiliary capacitor 23. The pixel 20 is connected to a gate line G, a data line D and an auxiliary-capacitor line Cs. The gate line G is a line used for selecting the pixel 20 to serve as one of pixels to be driven sequentially. The data line D is a line used for supplying a video-image voltage generated by the data driver 51 on the basis of the video-image signal D3 to the pixel 20 serving as one of pixels to be driven sequentially.

The liquid-crystal device 22 functions as a display element for carrying out a display operation of emitting display light in accordance with the video-image voltage supplied to the liquid-crystal device 22 by way of the TFT device 21. The liquid-crystal device 22 is configured to typically include a liquid-crystal layer (not shown) and a pair of electrodes (not shown) which sandwich the liquid-crystal layer. The liquid-crystal layer is configured to typically include a liquid-crystal device of a VA (Vertical Alignment) mode and a TN (Twisted Nematic) mode. The electrode at the specific node of the liquid-crystal device 22 is connected to the drain of the TFT device 21 and a specific one of the 2 nodes of the auxiliary capacitor 23. The other electrode of the liquid-crystal device 22 is connected to the ground.

The auxiliary capacitor 23 is a capacitive device for stabilizing electric charge accumulated in the liquid-crystal device 22. As described above, the specific node of the auxiliary capacitor 23 is connected to the drain of the TFT device 21 and the electrode at the specific node of the liquid-crystal device 22. The other one of the nodes of the auxiliary capacitor 23 is connected to the auxiliary-capacitor line Cs.

The TFT device 21 is a MOS-FET (Metal Oxide Semiconductor-Field Effect Transistor) device. The gate of the TFT device 21 is connected to the gate line G whereas the source of the TFT device 21 is connected to the data line D. As described above, the drain of the TFT device 21 is connected to the specific node of the auxiliary capacitor 23 and the electrode at the specific node of the liquid-crystal device 22. The TFT device 21 functions as a switching device for supplying the video-image voltage based on the video-image signal D3 to the specific node of the auxiliary capacitor 23 and the electrode at the specific node of the liquid-crystal device 22. To put it more concretely, the TFT device 21 is put in a turned-on state selectively by a select signal supplied by the gate driver 52 to the pixel 20 through the gate line G and connects the data line D to the specific node of the auxiliary capacitor 23 and the electrode at the specific node of the liquid-crystal device 22.

1-1-4: Detailed Configurations of the LUTs for the Overdrive Processing

Next, detailed typical configurations of the first and second LUTs (Look-Up Tables) used in the overdrive processing are explained by referring to FIGS. 3A and 3B. FIGS. 3A and 3B are model diagrams each showing a detailed typical configuration of an LUT used in overdrive processing. To put it in detail, FIG. 3A is a model diagram showing a detailed typical configuration of a first lookup table LUT1 used in an operation to output (or write) a video-image signal to (or into) pixels during the first frame sub-sub-period of a frame sub-period. On the other hand, FIG. 3B is a diagram showing a detailed typical configuration of a second lookup table LUT2 used in an operation to output (or write) the same video-image signals to (or into) pixels during the second frame sub-sub-period of the same frame sub-period.

Each of the first lookup tables LUT1 and LUT2 prescribes overdrive quantities, which each represent the luminance gradation of the video-image signal D3 obtained as a result of the overdrive processing, in accordance with the luminance gradation of the current video-image signal D1 and the luminance gradation of the immediately preceding video-image signal D2. It is to be noted that, in this case, each of the luminance gradations of the video-image signals D1, D2 and D3 has a value in a typical range of 0 to 255. In addition, each of the first lookup table LUT1 and the second lookup table LUT2 is shown as an LUT which prescribes only some representative luminance gradations. The following description also assumes such a typical range of the luminance gradations.

In the first lookup table LUT1 shown in FIG. 3A, much like the existing overdrive processing, each of the overdrive quantities represents a luminance gradation of the video-image signal D3 and is set at such a value that the gradation of the display luminance according to the video-image voltage based on the video-image signal D3 becomes equal to the desired gradation which is used as the target gradation. To put it more concretely, the overdrive quantities each prescribed by the first lookup table LUT1 shown in FIG. 3A as a luminance gradation of the video-image signal D3 are each set at a value which makes a difference in luminance gradation between the video-image signals D2 and D3 greater than a difference in luminance gradation between the video-image signals D1 and D2.

On the other hand, the second lookup table LUT2 shown in FIG. 3B is a table used for fine adjustment to sustain the display luminance according to the video-image voltage based on the video-image signal D3 at the desired gradation which is used as the target gradation or to change the display luminance to the desired gradation. To put it more concretely, the overdrive quantities set in the second lookup table LUT2 are each a quantity for sustaining a target luminance in the second output/write operation carried out during the second frame sub-sub-period of the same frame sub-period by performing fine adjustment such as a process of compensating for a swing-over phenomenon after the overdrive processing carried out in the first output/write operation. If a target luminance gradation cannot be attained in the first output/write operation carried out during the first frame sub-sub-period of a frame sub-period, on the other hand, an overdrive quantity set in the second lookup table LUT2 is used as an overdrive quantity for attaining the target luminance gradation in the second output/write operation carried out during the second frame sub-sub-period of the same frame sub-period.

1-2: Operations of the Video-Image Display System and its Effects

Next, operations of the video-image display system and its effects are explained.

1-2-1: Operations to Display 3D Video Images

First of all, operations carried out by the video-image display system to display 3D video images are explained by referring to the diagrams of FIGS. 1, 2 and 4 to 6 as follows.

1-2-2: Basic Operations

In the liquid-crystal display apparatus 1 shown in FIG. 1, the video-image signal processing section 41 controls the aforementioned output order (also referred to as a write order) of the right-eye video-image signal DR and the left-eye video-image signal DL for an input video-image signal Din to generate a current video-image signal D1 and supplies the video-image signal D1 to the overdrive processing section 44. Then, the frame memory 42 is used for temporarily storing a video-image signal D2 also based the input video-image signal Din as a signal immediately preceding the current video-image signal D1. Subsequently, in accordance with the luminance gradation of the immediately preceding video-image signal D2 temporarily stored in the frame memory 42 and the luminance gradation of the current video-image signal D1 currently output by the video-image signal processing section 41, the overdrive processing section 44 carries out overdrive processing on the video-image signal D1 to generate a video-image signal D3 and supplies the video-image signal D3 to the timing control section 45.

In the mean time, the shutter control section 43 supplies a timing control signal CTL to the shutter glasses 6 in accordance with timing control executed by the video-image signal processing section 41.

Then, the timing control section 45 passes on the video-image signal D3 to the data driver 51. Subsequently, the data driver 51 supplies a video-image voltage based on the video-image signal D3 to each of the pixels 20. To put it more concretely, the data driver 51 carries out a D/A process of converting the digital video-image signal D3 into an analog video-image signal which is the video-image voltage mentioned above and outputs the analog video-image signal to the pixels 20.

Then, in accordance with the video-image voltages received by the pixels 20 as driving voltages and select signals received by the pixels 20 from the gate driver 52, a sequential display driving operation is carried out on each of the pixels 20 on a row-after-row basis.

To put it more concretely, as shown in FIG. 2, a select signal supplied by the gate driver 52 to the gate of the TFT device 21 changes the state of the TFT device 21 from a turned-off state to a turned-on state. With the TFT device 21 put in a turned-on state, the liquid-crystal device 22 and the auxiliary capacitor 23 are connected to the data line D. As a result, a video-image voltage based on a video-image signal D3 supplied by the data driver 51 to the source of the TFT device 21 is applied to the liquid-crystal device 22 in the aforementioned display driving operation carried out on the pixel 20 as described above.

In a pixel 20 with the liquid-crystal device 22 and the auxiliary capacitor 23 both connected to the data line D, illuminated light radiated by the backlight 3 to the pixel 20 is modulated and emitted by the liquid-crystal display panel 2 as display light. Thus, the liquid-crystal display apparatus 1 displays a video image based on the input video-image signal Din. To put it more concretely, a right-eye video image based on a right-eye video-image signal DR and a left-eye video image based on a left-eye video-image signal DL are displayed alternately on a time-division basis in the so-called time-division driving operation.

Figure 4A:
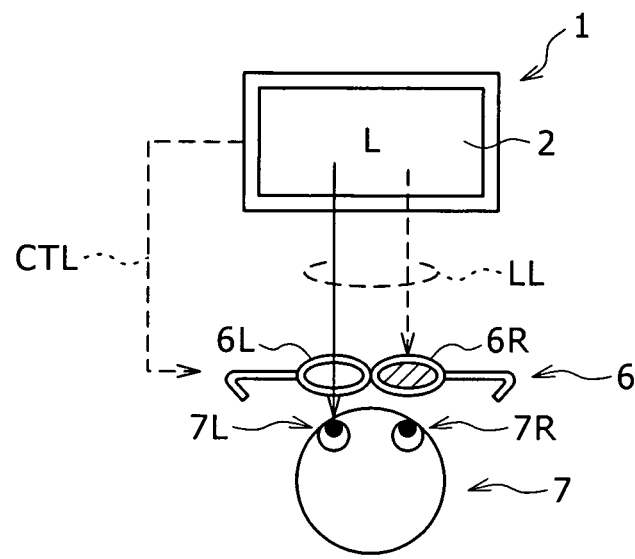
FIGS. 4A and 4B are model diagrams each to be referred to in explanation of a 3D video-image displaying operation carried out by the video-image display system shown in FIG. 1.

During an operation shown in FIG. 4A as an operation to display a video image for the left eye in the time-division driving operation, a control signal CTL generated by the shutter control section 43 sustains the light shielding function of the shutter of right-eye lens 6R employed in the shutter glasses 6 used by the viewer 7 in an effective (or close) state and puts the light shielding function of the shutter of left-eye lens 6L in an ineffective (or open) state. That is to say, the left-eye lens 6L is sustained in the ineffective (or open) state for transmission of left-eye display light LL originated from the displayed video image for the left eye whereas the right-eye lens 6R is sustained in the effective (or close) state for the transmission of the left-eye display light LL.

Figure 4B:
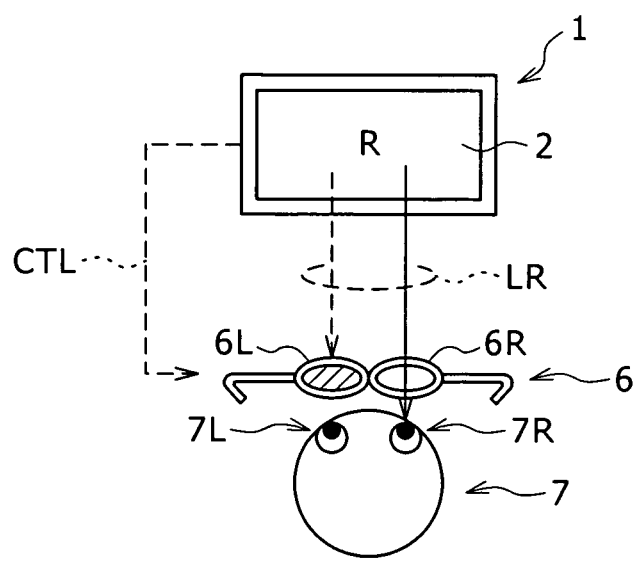

During an operation shown in FIG. 4B as an operation to display a video image for the right eye in the time-division driving operation, on the other hand, the control signal CTL generated by the shutter control section 43 sustains the light shielding function of the shutter of left-eye lens 6L employed in the shutter glasses 6 used by the viewer 7 in an effective (or close) state and puts the light shielding function of the shutter of right-eye lens 6R in an ineffective (or open) state. That is to say, the right-eye lens 6R is sustained in the ineffective (or open) state for transmission of right-eye display light LR originated from the displayed video image for the right eye whereas the left-eye lens 6L is sustained in the effective (or close) state for the transmission of the right-eye display light LR.

The operations shown in FIGS. 4A and 4B are carried out alternately and repeatedly so that, when the viewer 7 is looking at the display screen of the liquid-crystal display apparatus 1 by wearing the shutter glasses 6, the viewer 7 sees a 3D video image. That is to say, the viewer 7 sees a video image for the left eye through the left-eye lens 6L and a video image for the right eye through the right-eye lens 6R. Since there is a disparity between the video image for the left eye and the video image for the right eye, the viewer 7 recognizes the displayed video image as a 3D video image having a depth.

1-2-3: Consecutive Write/Display Operations

Figure 5A:
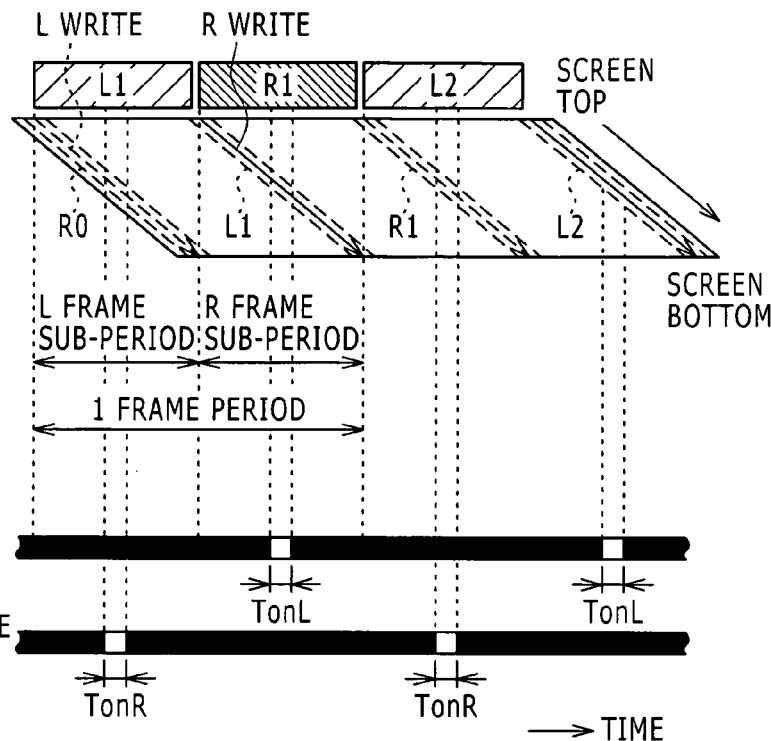
FIGS. 5A and 5B are timing diagrams to be referred to in explanation of crosstalk that can be generated in an operation carried out by the existing video-image display apparatus to display a 3D video image.
Figure 5B:
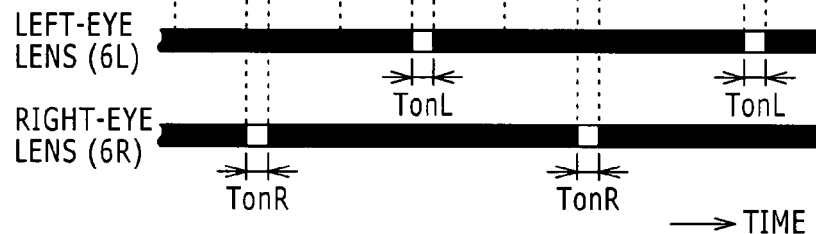

FIGS. 5A and 5B are timing diagrams referred to in explanation of crosstalk that can be generated in an operation carried out by the existing video-image display apparatus to display a 3D video image by adoption of such a time-division driving method. To be more specific, FIG. 5A is a timing diagram of operations to write and display a video image on a display screen whereas FIG. 5B is a diagram showing timings of states of the shutter glasses 6 having the left-eye lens 6L and the right-eye lens 6R. It is to be noted that, in the timing diagram of FIG. 5A, a solid-line arrow denotes an R write timing which is a timing to write a video-image signal for the right eye. On the other hand, a dashed-line arrow denotes an L write timing which is a timing to write a video-image signal for the left eye. These solid-line and dashed-line arrows are also used in subsequent figures and mean the same things. In the same diagrams, a time period encircled by a dashed line is a time period during which the desired display luminance of a video image for the period is attained. For example, a time period encircled by a dashed line R0 is a time period during which the desired display luminance of the right-eye video image R0 output for the period is attained. These encircling dashed lines are also used in subsequent figures and mean the same things.

In the timing diagram of FIG. 5B, on the other hand, a period shown in a black color is a close-shutter period of the left-eye lens 6L and the right-eye lens 6R whereas a period shown in a white color is an open-shutter period TonL of the left-eye lens 6L or an open-shutter period TonR of the right-eye lens 6R. The period shown in a black color and the period shown in a white color are also used in subsequent figures and mean the same things.

In the operation carried out by the existing video-image display apparatus to display a 3D video image, as shown in the timing diagram of FIG. 5A, in the L frame sub-period included of each frame period, a signal representing a video image for the left eye is written once into the liquid-crystal display panel 2. Thus, left-eye video images L1, L2 and so on are displayed consecutively on the liquid-crystal display panel 2 during a plurality of L frame sub-periods which are each included in a frame period. By the same token, in the R frame sub-period included in each frame period, a signal representing a video image for the right eye is written once into the liquid-crystal display panel 2. Thus, right-eye video images R0, R1 and so on are displayed consecutively on the liquid-crystal display panel 2 during a plurality of R frame sub-periods which are each included in a frame period.

In the operation carried out by the existing video-image display apparatus to display a 3D video image, it takes time for each liquid-crystal device 22 employed in the liquid-crystal display panel 2 to give a response. Thus, the time to attain the desired display luminance lags behind the write timing. To be more specific, the time to display a predetermined luminance gradation of the video image for the left eye lags behind the L write timing whereas the time to display a predetermined luminance gradation of the video image for the right eye lags behind the R write timing.

As shown in FIG. 5B, on the other hand, each of an open-shutter period TonL of the left-eye lens 6L and an open-shutter period TonR of the right-eye lens 6R is set between the L write timing and the R write timing.

In a liquid-crystal display apparatus adopting the time-division driving method, however, video images of one frame period are displayed on the screen sequentially on a row-after-row basis in a direction from the top of the screen to the bottom thereof as shown in the timing diagram of FIG. 5A. Thus, without regard to how each of an open-shutter period TonL of the left-eye lens 6L and an open-shutter period TonR of the right-eye lens 6R is set between the L write timing and the R write timing, the liquid-crystal display apparatus raises the following problems. Interferences and/or crosstalk are generated between a left-eye video image and a right-eye video image which are adjacent to each other. When such interferences and/or such crosstalk are generated, at the top and/or bottom of the display screen in the 3D image display system making use of the shutter glasses 6, the right-hand side portion of a displayed image is seen by the left eye whereas the left-hand side portion of the displayed image is seen by the right eye or vice versa so that the correct 3D video image can hardly be recognized. Such crosstalk and/or such interferences are generated because of poor characteristics of the LCD apparatus and/or poor characteristics of light shielding shutters employed in the shutter glasses 6. Poor characteristics of the LCD apparatus include an inadequate response speed of the apparatus whereas poor characteristics of the light shielding shutters employed in the shutter glasses 6 include insufficient shutter contrasts.

Figure 6A:
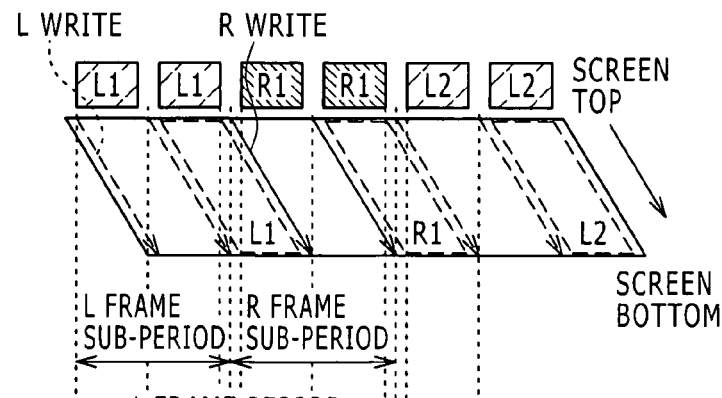
FIGS. 6A and 6B are timing diagrams to be referred to in explanation of an outline of an operation carried out by the video-image display system shown in FIG. 1 to display a 3D video image.
Figure 6B:
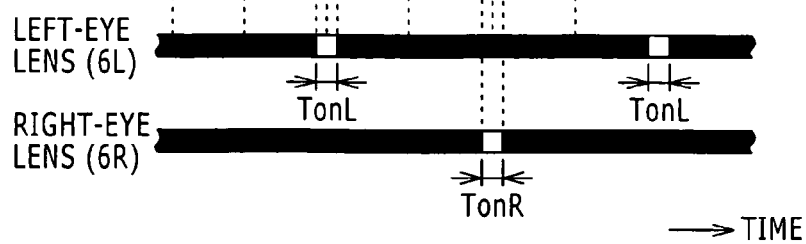

In order to solve the problems described above, the first embodiment of the present invention carries out operations to display a 3D video image by adoption of a continuous write/display method like one shown in FIGS. 6A and 6B. FIGS. 6A and 6B are timing diagrams referred to in explanation of an outline of an operation carried out by the video-image display system shown in FIG. 1 to serve as an apparatus for displaying a 3D video image in accordance with the first embodiment. To be more specific, FIG. 6A is a timing diagram of operations to write video-image signals onto pixels and display a 3D video image whereas FIG. 6B is a diagram showing timings of states of shutter glasses 6 having a left-eye lens 6L and a right-eye lens 6R much like the timing diagrams of FIGS. 5A and 5B respectively.

In the operation carried out by the video-image display system shown in FIG. 1 to display a 3D video image by adoption of the continuous write/display method cited above, as shown in the timing diagram of FIG. 6A, in the L frame sub-period included in each frame period, a signal representing a video image for the left eye is written two times in a row into the liquid-crystal display panel 2 in two consecutive write/display operations during first and second L frame sub-sub-periods respectively. Thus, two left-eye video images L1, L2 and so on are displayed consecutively on the liquid-crystal display panel 2 in a plurality of L frame sub-sub-periods each included in a frame period. By the same token, in the R frame sub-period included in each frame period, a signal representing a video image for the right eye is written two times in a row into the liquid-crystal display panel 2 in two consecutive write/display operations during first and second R frame sub-sub-periods respectively. Thus, right-eye video images R0, R1 and so on are displayed consecutively on the liquid-crystal display panel 2 a plurality of R frame sub-sub-periods each included in a frame period.

That is to say, in one frame period, video images are displayed for example in the following order: a left-eye video image L1→the left-eye video image L1→a right-eye video image R1→the right-eye video image R1. Then, the operation to write the video-image signal for the second time in the second write/display operation during the second frame sub-sub-period is completed in the frame sub-period for the signal. In a time period during which each liquid-crystal device 22 on the entire display screen is sustaining a desired luminance gradation, one of the left-eye lens 6L and the right-eye lens 6R which are employed in the shutter glasses 6 is put in an open state. To put it more concretely, as shown in the timing diagram of FIG. 6B for example, a left-eye open-shutter period TonL is set between the timing to write the specific left-eye video-image signal L1 for the second time and the timing to write the right-eye video-image signal R1 immediately following the specific left-eye video-image signal L1. On the other hand, a right-eye open-shutter period TonR is set between the timing to write the particular right-eye video-image signal R1 for the second time and the timing to write the left-eye video-image signal L2 immediately following the particular right-eye video-image signal R1.

Thus, unlike the traditional operation to display a 3D video image as shown in FIGS. 5A and 5B, in the operation to display a 3D video image according to the first embodiment as shown in FIGS. 6A and 6B, ideally, the left-eye lens 6L employed in the shutter glasses 6 is put in an open state only while a video image for the left eye is being displayed on the entire screen whereas the right-eye lens 6R employed in the shutter glasses 6 is put in an open state only while a video image for the right eye is being displayed on the entire display screen.

1-3: Overdrive Processing

Next, with reference to diagrams of FIGS. 3 and 7 to 10 and by comparing the first embodiment with a typical comparison example, the following description explains details of the overdrive processing which serves as one of characteristics of the present invention.

First of all, the first embodiment carries out the operation to write and display a 3D video image by adoption of a continuous write/display method as described above in order to reduce the amount of crosstalk to a level lower than that provided by the existing video-image display system.

During an operation to display a video image in accordance with the time-division driving method described above, however, a plurality of video images are always displayed repeatedly so that the liquid-crystal devices 22 never get settled in a steady state in many cases. In this case, the video images are video images for the left and right eyes. Thus, if the overdrive processing premising a transition from the steady state as is the case with the overdrive processing used in the existing operation to display a 2D video image is applied as it is to a video-image display operation carried out by adoption of the time-division driving method in order to compensate for the insufficient response speed of the liquid-crystal device 22, the optimum level of an applied voltage cannot be obtained so that a shift from target luminance is inevitably resulted in. As a result, crosstalk is undesirably generated. In addition, also if the existing overdrive processing used in the existing operation to display a 2D video image is applied as it is to a video-image display operation carried out by adoption of the continuous write/display method described above, similarly, a shift from target luminance is resulted in unavoidably and crosstalk is undesirably generated as will be described as follows.

1-3-1: Overdrive Processing of a Typical Comparison Example

FIGS. 7A to 7C are timing diagrams referred to in explanation of typical overdrive processing provided for a comparison purpose. To put it in detail, FIGS. 7A to 7C are timing diagrams referred to in explanation of a case in which the existing overdrive processing used in the existing operation to display a 2D video image is applied as it is to a video-image display operation carried out by adoption of the continuous write/display method according to the first embodiment as described above. To be more specific, FIG. 7A is a timing diagram of a current video-image signal D1 whereas FIG. 7B is a timing diagram of a video-image signal D102 which is read out from the frame memory 42. FIG. 7C is a timing diagram of a video-image signal D103 which is generated by the overdrive processing section 44.

In the timing diagrams of FIG. 7A, reference notation SFR02 denotes a second frame sub-sub-period included in an R frame sub-period used for writing (and displaying) a right-eye video image R0. On the other hand, reference notation SFL11 denotes a first frame sub-sub-period included in an L frame sub-period used for writing (and displaying) a left-eye video image L1. By the same token, reference notation SFL12 denotes a second frame sub-sub-period included in the L frame sub-period used for writing (or displaying) the left-eye video image L1. On the other hand, reference notation SFR11 denotes a first frame sub-sub-period included in an R frame sub-period used for writing (and displaying) a right-eye video image R1. By the same token, reference notation SFR12 denotes a second frame sub-sub-period included in the R frame sub-period used for writing (and displaying) the right-eye video image R1.

In addition, in the timing diagrams of FIG. 7C, reference notation "OD LUT" denotes an LUT (Look-Up Table) used in the existing OD (overdrive) processing. Reference notation $L1_{OD}$ denotes a left-eye video image obtained as a result of overdrive processing carried out on the left-eye video image L1. By the same token, reference notation $R1_{OD}$ denotes a right-eye video image obtained as a result of overdrive processing carried out on the right-eye video image R1.

It is to be noted that the reference notations described above are also used in subsequent diagrams and mean the same things.

In each of the consecutive write operations, the typical overdrive processing provided for a comparison purpose is carried out always in accordance with the luminance gradation of the current (unitary) video image and the luminance gradation of an immediately preceding (unitary) video image immediately leading ahead of the current unitary video image regardless of whether or not the current unitary video image and the immediately preceding unitary video image are the same video image or pertain to the same video-image stream. To put it more concretely, in an L frame sub-period to write a left-eye video image L1 for example, overdrive processing like one described as follows is carried out.

First of all, in the first frame sub-sub-period SFL11, in accordance with the luminance gradation of the video-image signal D102 already stored in the frame memory as a signal representing the immediately preceding video image R0 and the luminance gradation of the video-image signal D1 being processed as a signal representing the current video image L1, the overdrive processing is carried out in order to generate a left-eye video image $L1_{OD}$. Then, in the second frame sub-sub-period SFL12, in accordance with the luminance gradation of the video-image signal D102 already stored in the frame memory as a signal representing the immediately preceding video image L1 and the luminance gradation of the video-image signal D1 being processed as a signal representing the current video image L1, the overdrive processing is carried out. Since the current video image and the video image immediately preceding the current video image are the same video image which is the left-eye video image L1 in this case, however, a difference in luminance gradation between the current video image and the video image immediately preceding the current video actually does not exist so that, virtually, no overdrive processing is carried out. Thus, a signal representing the left-eye video image L1 is output as it is as the left-eye video-image signal D103. That is to say, since the overdrive processing is carried out in only the first one of the two consecutive write operations performed during the first frame sub-sub-period SFL11 and the second frame sub-sub-period SFL12 respectively, the function of the overdrive processing cannot be fully demonstrated.

Figure 8:
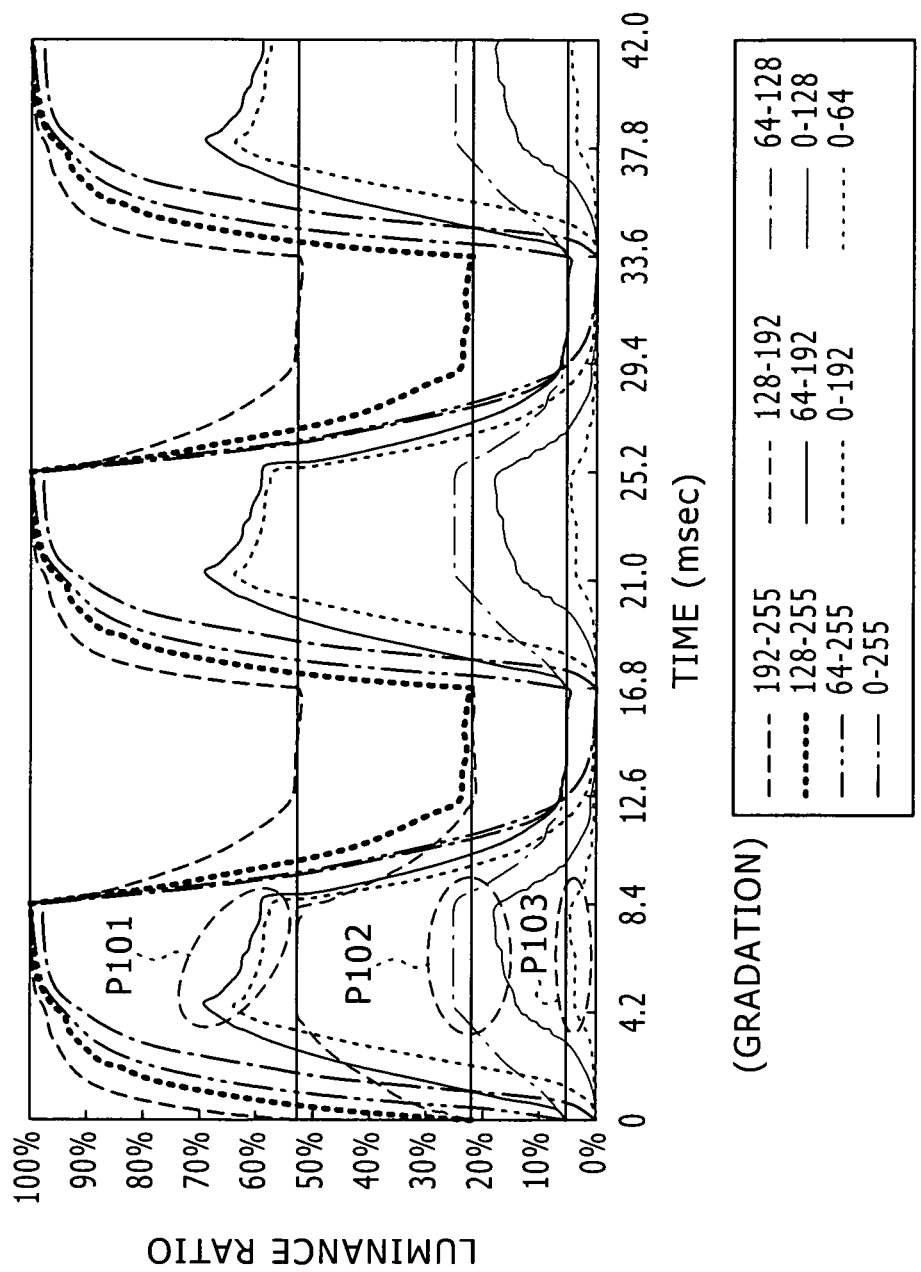
FIG. 8 is a diagram showing typical response characteristics of the display luminance in the course of execution of the overdrive processing shown in FIGS. 7A to 7C.
Figure 9:
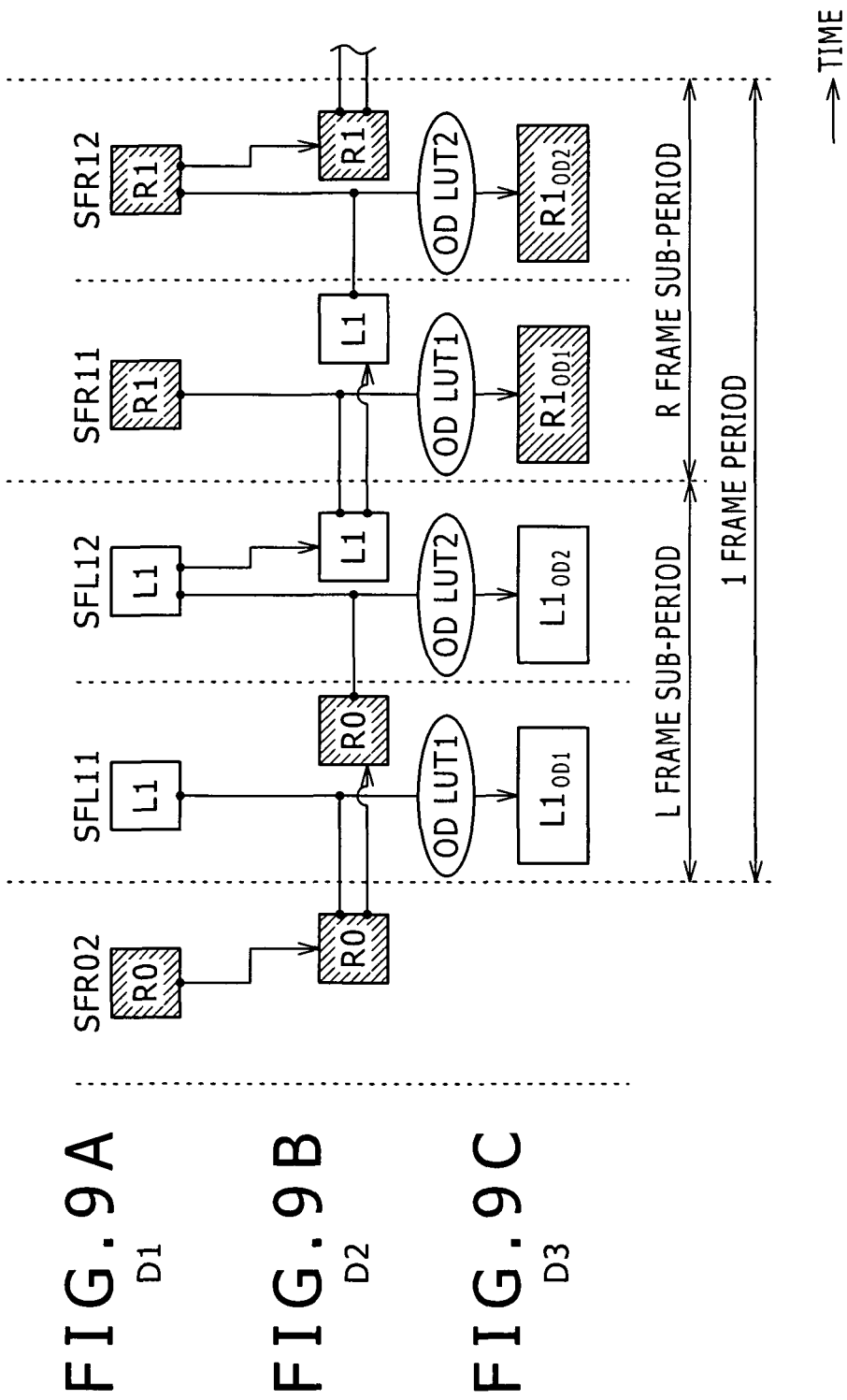
FIGS. 9A to 9C are timing diagrams to be referred to in explanation of overdrive processing carried out by the first embodiment.

To put it more concretely, as indicated by reference notations P101 to P103 shown in FIG. 8, in the response characteristic of the display luminance of the liquid-crystal device 22, a big shift from a target luminance is generated so that crosstalk undesirably occurs. The target luminance is a gradation for a luminance ratio shown by a solid line in the diagram of FIG. 8. It is to be noted that notation "0-64" (or the like) used in the diagram of FIG. 8 represents a case in which a luminance-gradation difference between the gradation of 0 and the gradation of 64 is generated between the left-eye video image and the right-eye video image. To put it more concretely, notation "0-64" represents a case in which the following transitions take place: gradation of 0→gradation of 0→gradation of 64→gradation of 64→gradation of 0→gradation of 0→gradation of 64→gradation of 64→and so on. Such notations also mean the same things in a diagram of FIG. 10.

1-3-2: OD Processing of the First Embodiment

In the case of the first embodiment, on the other hand, overdrive processing described below is carried out in accordance with the luminance gradation of the immediately preceding video-image signal D2 already stored in the frame memory 42 and the luminance gradation of the current video-image signal D1 currently being output from the video-image signal processing section 41. To put it more concretely, for every operation to output each of video-image signals included in the current video-image signal D1, the overdrive processing is carried out in order to generate a video-image signal D3. The video-image signals included in the current video-image signal D1 are a right-eye video-image signal DR and a left-eye video-image signal DL.

FIGS. 9A to 9C is a plurality of timing diagrams referred to in explanation of the overdrive processing carried out by the first embodiment. To be more specific, FIG. 9A is a timing diagram of the current video-image signal D1, FIG. 9B is a timing diagram of the immediately preceding video-image signal D2 whereas FIG. 9C is a timing diagram of the newly generated video-image signal D3.

In the overdrive processing carried out by the first embodiment, an operation to output every video-image signal included in the current video-image signal D1 is carried out repeatedly two times in a row during first and second frame sub-sub-periods respectively, and a luminance gradation of the immediately preceding video-image signal D2 other than and different from the current video-image signal D1 is used in the overdrive processing as a gradation common to the overdrive processing carried out during the first frame sub-sub-period and the overdrive processing carried out during the second frame sub-sub-period. As described above, the video-image signals included in the current video-image signal D1 are a right-eye video-image signal DR and a left-eye video-image signal DL. The overdrive processing can be carried out by making use of the luminance gradation of the immediately preceding video-image signal D2 because, during the current frame sub-period, the immediately preceding video-image signal D2 output by the video-image signal processing section 41 in the immediately preceding frame sub-period has been always stored in the frame memory 42 as explained earlier. The current frame sub-period can be an L frame sub-period or an R frame sub-period.

Thus, if the current frame sub-period is an L frame sub-period for example, in the overdrive processing carried out by the overdrive processing section 44, an operation to output a left-eye video-image signal DL serving as the current video-image signal D1 is carried out repeatedly two times in a row during respectively the first and second frame sub-sub-periods of the current L frame sub-period, and a luminance gradation of a right-eye video-image signal DR output in an R frame sub-period immediately preceding the current L frame sub-period to serve as the immediately preceding video-image signal D2 is used in the overdrive processing as a gradation common to the overdrive processing carried out during the first frame sub-sub-period and the overdrive processing carried out during the second frame sub-sub-period. To put it more concretely, in the current L frame sub-period to write a left-eye video-image signal L1 for example, overdrive processing like one described as follows is carried out.

First of all, in the first frame sub-sub-period SFL11, overdrive processing is carried out in order to generate a left-eye video image $L1_{OD1}$ in accordance with the luminance gradation of the video-image signal D2 already stored in the frame memory 42 as a signal representing the video image R0 output during an R frame sub-period immediately preceding the current L frame sub-period and the luminance gradation of the video-image signal D1 currently being processed as a signal representing the current video image L1.

Then, in the same way as the first frame sub-sub-period SFL11, in the second frame sub-sub-period SFL12, overdrive processing is carried out in order to generate a left-eye video image $L1_{OD2}$ in accordance with the luminance gradation of the video-image signal D2 already stored in the frame memory 42 as a signal representing the video image R0 output during an R frame sub-period immediately preceding the current L frame sub-period and the luminance gradation of the video-image signal D1 currently being processed as a signal representing the current video image L1.

That is to say, the overdrive processing according to the first embodiment is different from the overdrive processing described before as the typical overdrive processing provided for a comparison purpose in that, in the case of the overdrive processing according to the first embodiment, it is possible to avoid a case in which, also for the second frame sub-sub-period SFL12, the current video image and an immediately preceding video image immediately leading ahead of the current video image are inadvertently the same video image. Thus, in the case of the overdrive processing according to the first embodiment, it is possible to prevent overdrive processing from being carried out without a difference in luminance gradation between the current video image and the immediately preceding video image immediately leading ahead of the current video image.

If the current frame sub-period is an R frame sub-period, on the other hand, in the overdrive processing carried out, an operation to output a right-eye video-image signal DR serving as the current video-image signal D1 is carried out repeatedly two times in a row during respectively the first and second frame sub-sub-periods of the current R frame sub-period, and a luminance gradation of a left-eye video-image signal DL output in an L frame sub-period immediately preceding the current R frame sub-period to serve as the immediately preceding video-image signal D2 is used in the overdrive processing as a gradation common to the overdrive processing carried out during the first frame sub-sub-period and the overdrive processing carried out during the second frame sub-sub-period. To put it more concretely, in the current R frame sub-period to write a right-eye video-image signal R1 for example, overdrive processing like one described as follows is carried out.

First of all, in the first frame sub-sub-period SFR11, overdrive processing is carried out in order to generate a right-eye video image $R1_{OD1}$ in accordance with the luminance gradation of the video-image signal D2 already stored in the frame memory 42 as a signal representing the video image L1 output during an L frame sub-period immediately preceding the current R frame sub-period and the luminance gradation of the video-image signal D1 currently being processed as a signal representing the current video image R1.

Then, in the same way as the first frame sub-sub-period SFR11, in the second frame sub-sub-period SFR12, overdrive processing is carried out in order to generate a right-eye video image $R1_{OD2}$ in accordance with the luminance gradation of the video-image signal D2 already stored in the frame memory 42 as a signal representing the video image L1 output during an L frame sub-period immediately preceding the current R frame sub-period and the luminance gradation of the video-image signal D1 currently being processed as a signal representing the current video image R1.

That is to say, the overdrive processing according to the first embodiment is different from the overdrive processing described before as the typical overdrive processing provided for a comparison purpose in that, in the case of the overdrive processing according to the first embodiment, it is possible to avoid a case in which, also for the second frame sub-sub-period SFR12, the current video image and an immediately preceding video image immediately leading ahead of the current video image are inadvertently the same video image. Thus, in the case of the overdrive processing according to the first embodiment, it is possible to prevent overdrive processing from being carried out without a difference in luminance gradation between the current video image and the immediately preceding video image immediately leading ahead of the current video image.

In the overdrive processing carried out by the overdrive processing section 44 in accordance with the first embodiment, an operation to output every video-image signal included in the current video-image signal D1 is performed repeatedly two times in a row during first and second frame sub-sub-periods respectively. A LUT (Look-Up Table) prescribing overdrive quantities is referred to in each of the two consecutive output/write operations carried out during the first and second frame sub-sub-periods respectively. However, a first lookup table LUT1 used in the first one of the two consecutive output/write operations is different from a second lookup table LUT2 used in the second one. The overdrive quantities prescribed by the first lookup table LUT1 used in the first output/write operation are different from the overdrive quantities prescribed by the second lookup table LUT2 used in the second output/write operation. One of the overdrive quantities prescribed by the first lookup table LUT1 or the second lookup table LUT2 is selected in accordance with the luminance gradation of the current video-image signal D1 and the luminance gradation of the immediately preceding video-image signal D2. The selected overdrive quantity is used as the luminance gradation of the video-image signal D3 newly generated in the overdrive processing.

A typical example of the first lookup table LUT1 used in the first output/write operation corresponding to for example the first frame sub-sub-period SFL11 or SFR11 described before is a first lookup table LUT1 shown in FIG. 3A. In the first lookup table LUT1, much like the existing overdrive processing, each of the overdrive quantities represents a luminance gradation of the video-image signal D3 and is set at such a value that the gradation of the display luminance according to the video-image voltage based on the video-image signal D3 becomes equal to the desired gradation which is used as the target gradation. To put it more concretely, the overdrive quantities each prescribed by the first lookup table LUT1 as a luminance gradation of the video-image signal D3 are each set at a value which makes a difference in luminance gradation between the video-image signals D2 and D3 greater than a difference in luminance gradation between the video-image signals D1 and D2. Thus, in the same way as the existing overdrive processing, the response speed of each liquid-crystal device 22 can be increased.

On the other hand, a second lookup table LUT2 shown in FIG. 3B is a table used in the second output/write operation carried out during for example the second frame sub-sub-period SFL12 or SFR12 described before. The second lookup table LUT2 shown in FIG. 3B is a table used for fine adjustment to sustain the display luminance according to the video-image voltage based on the video-image signal D3 at the desired gradation which is used as the target gradation, or to change the display luminance to the desired gradation. To put it more concretely, the overdrive quantities set in the second lookup table LUT2 are each a quantity for sustaining a target luminance in the second output/write operation carried out during the second frame sub-sub-period of the same frame sub-period by performing fine adjustment such as a process of compensating for a swing-over phenomenon after the overdrive processing associated with the first output/write operation. If a target luminance gradation cannot be attained in the first output/write operation, on the other hand, an overdrive quantity set in the second lookup table LUT2 is used as an overdrive quantity for attaining a target luminance gradation in the second output/write operation. Thus, unlike the typical overdrive processing provided for a comparison purpose, in the second output/write operation, the target luminance can be sustained.

As described above, in the overdrive processing carried out by the first embodiment, an operation to output every video-image signal included in the current video-image signal D1 (a right-eye video-image signal DR and a left-eye video-image signal DL) is carried out repeatedly two times, and a luminance gradation of a video-image signal output in a frame sub-period immediately preceding the current frame sub-period to serve as the immediately preceding video-image signal D2 is used in the overdrive processing as a gradation common to the overdrive processing carried out during the first frame sub-sub-period and the overdrive processing carried out during the second frame sub-sub-period.

On the other hand, the typical overdrive processing provided for a comparison purpose is carried out in each of the consecutive output/write operations always in accordance with the luminance gradation of the current (unitary) video image and the luminance gradation of an immediately preceding (unitary) video image immediately leading ahead of the current unitary video image regardless of whether or not the current unitary video image and the immediately preceding unitary video image immediately are the same video image or pertain to the same video-image stream.

Thus, in comparison with the typical overdrive processing provided for a comparison purpose, it is possible to reduce a shift between the target luminance and the display luminance based on the video-image signal D3 which is obtained as a result of the overdrive processing carried out by the first embodiment. The display luminance based on the video-image signal D3 is used as the display luminance of the liquid-crystal device 22.

Figure 10:
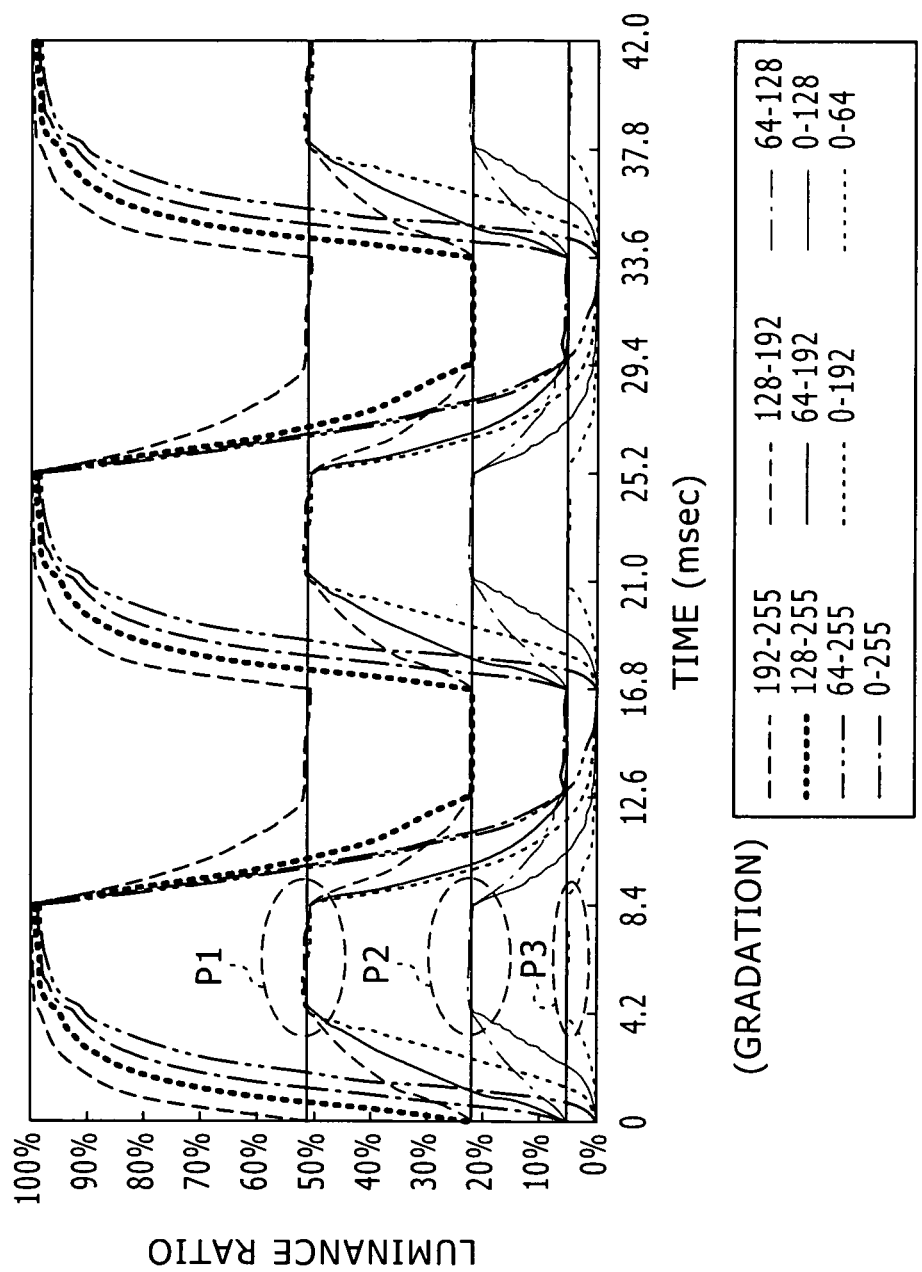
FIG. 10 is a timing diagram showing typical response characteristics of the display luminance in the course of execution of the overdrive processing shown in FIGS. 9A to 9C.

To put it more concretely, as indicated by reference notations P1, P2 and P3 shown in FIG. 10, in the response characteristic of the display luminance generated by the liquid-crystal device 22 in accordance with a video-image voltage applied to the pixel 20 employing the liquid-crystal device 22, the shift from the target luminance is reduced to a value smaller than the shift generated in the typical overdrive processing as shown in FIG. 8. Thus, in comparison with the typical overdrive processing, it is possible to reduce the amount of crosstalk which appears as interferences among a plurality of consecutive video images.

In the first embodiment described so far, an immediately preceding unitary video image D2 immediately leading ahead of a current unitary video image D1 currently output by the video-image signal processing section 41 is stored as it is in the frame memory 42. The current unitary video image D1 pertains to a current video-image stream whereas the immediately preceding video image D2 is selected from an immediately video-image stream which is other than and different from the current video-image stream. Each of the current video-image stream and the immediately preceding video-image stream includes a left-eye video-image signal DL and a right-eye video-image signal DR. In addition, in accordance with the luminance gradation of the immediately preceding video-image signal D2 already stored in the frame memory 42 and the luminance gradation of the current video-image signal D1 presently being output by the video-image signal processing section 41, the overdrive processing section 44 carries out overdrive processing on the current video-image signal D1 in order to generate a video-image signal D3.

On the other hand, the typical overdrive processing provided for a comparison purpose is carried out in each of the consecutive write operations always in accordance with the luminance gradation of the current (unitary) video image and the luminance gradation of an immediately preceding (unitary) video image immediately leading ahead of the current unitary video image regardless of whether or not the current unitary video image and the immediately preceding unitary video image are the same (unitary) video image or pertain to the same video-image stream.

Thus, in comparison with the typical overdrive processing provided for a comparison purpose, it is possible to reduce a shift between the target luminance and the display luminance based on the video-image signal D3 which is obtained as a result of the overdrive processing carried out by the first embodiment. The display luminance based on the video-image signal D3 is used as the display luminance of the liquid-crystal device 22. As a result, it is possible to reduce the amount of crosstalk which appears as interferences among a plurality of consecutive video images.

In addition, in the overdrive processing carried out by the overdrive processing section 44 in accordance with the first embodiment, an operation to output every video-image signal is performed repeatedly two times in a row in first and second output/write operations respectively during the first and second frame sub-sub-periods of a frame sub-period. The lookup table LUT1 used in the overdrive processing carried out during the first frame sub-sub-period is different from the lookup table LUT2 used in the overdrive processing carried out during the second frame sub-sub-period. The overdrive quantities set in the second lookup table LUT2 as overdrive quantities of the video-image signal D3 are each a quantity used for fine adjustment of sustaining a target luminance in the second output/write operation carried out during the second frame sub-sub-period of the same frame sub-period by performing the fine adjustment such as a process of compensating for a swing-over phenomenon after the overdrive processing associated with the first output/write operation. Thus, unlike the typical overdrive processing provided for a comparison purpose, in the second output/write operation carried out during the second frame sub-sub-period, the target luminance can be sustained. As a result, in a period during which the target luminance has been sustained throughout the entire display screen, the shutters can be put in an open state so that it is possible to reduce the amount of crosstalk.

2: Second Embodiment

Next, a second embodiment of the present invention is explained. It is to be noted that components employed in the second embodiment to serve as components identical with their respective counterparts included in the first embodiment are denoted by the same reference numerals or the same reference notations as the counterparts. In addition, the identical components are not explained again in order to avoid duplications of explanations unless descriptions of the identical components are absolutely required.

Figure 11:
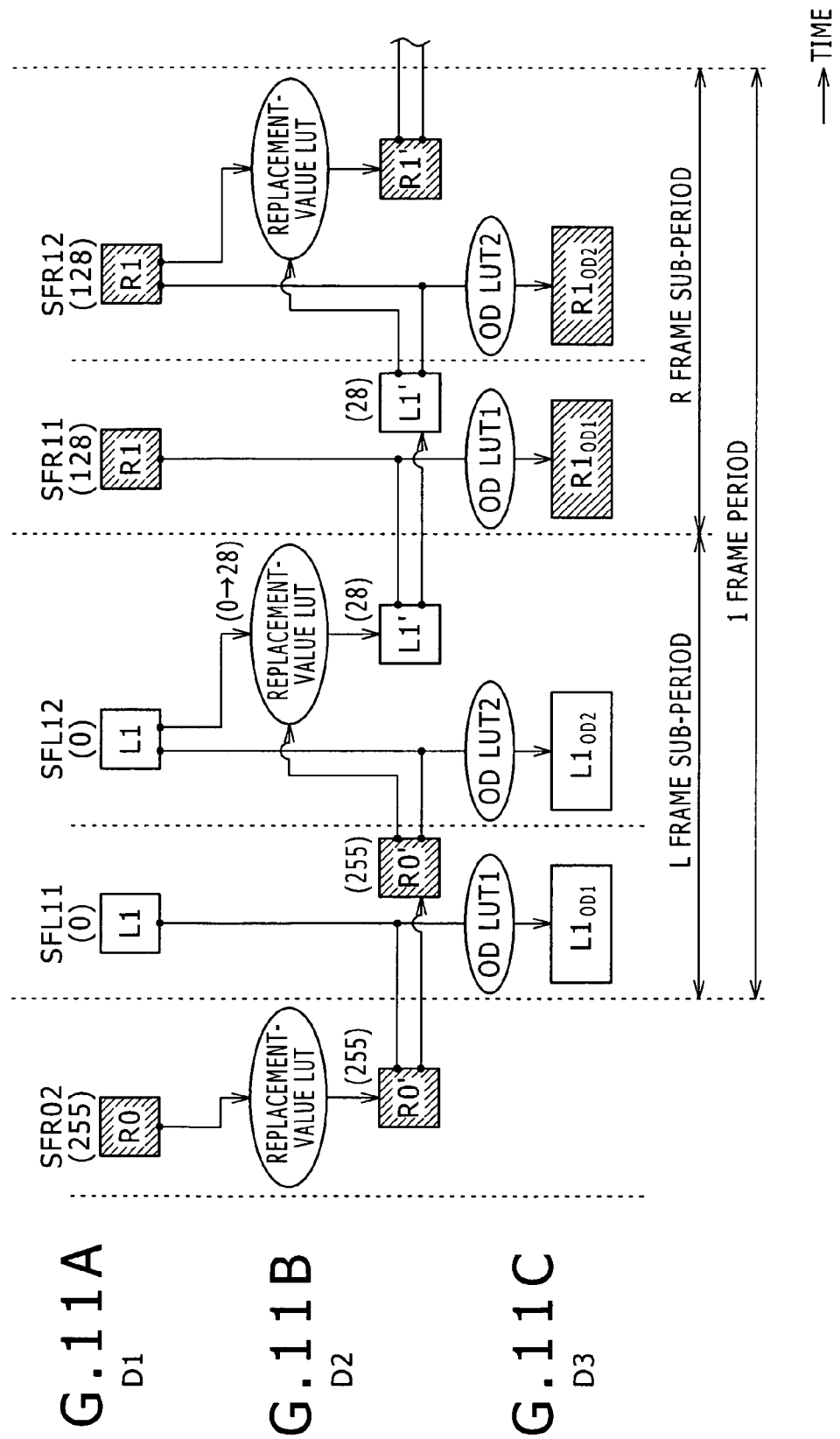
FIGS. 11A to 11C are timing diagrams to be referred to in explanation of overdrive processing carried out by a second embodiment of the present invention.

FIGS. 11A to 11C are timing diagrams referred to in explanation of overdrive processing carried out by the second embodiment of the present invention. To be more specific, FIG. 11A is a timing diagram of a current video-image signal D1, FIG. 11B is a timing diagram of an immediately preceding video-image signal D2 whereas FIG. 14C is a timing diagram of a newly generated video-image signal D3.

In the same way as the first embodiment, the overdrive processing is carried out by the second embodiment on the current video-image signal D1, which is output by the video-image signal processing section 41 from the input video-image signal Din, and an immediately preceding video-image signal D2 already stored in the frame memory 42 in order to generate the video-image signal D3 as a result of the overdrive processing. In the case of the second embodiment, however, the immediately preceding video-image signal D2 stored in the frame memory 42 has an updated luminance gradation. That is to say, before the immediately preceding video-image signal D2 is stored in the frame memory 42, the luminance gradation of the immediately preceding video-image signal D2 is updated by referring to a replacement-value LUT (lookup table) to be described later in order to generate a post-replacement video-image signal D2. Then, the video-image signal processing section 41 newly stores the post-replacement video-image signal D2 in the frame memory 42.

To put it more concretely, for example, in a second frame sub-sub-period SFR02 explained earlier, as shown in FIGS. 11A to 11C, the video-image signal processing section 41 makes use of the replacement-value LUT to replace the luminance gradation of the video-image signal D1 (or, to be more specific, the right-eye video-image signal R0) serving as the immediately preceding video-image signal D2 to be newly stored in the frame memory 42 in order to generate a video-image signal D2 (or, to be more specific, the right-eye video-image signal R0') which is the post-replacement video-image signal D2 cited above. Then, the video-image signal processing section 41 stores the post-replacement video-image signal D2 in the frame memory 42 as the immediately preceding video-image signal D2.

By the same token, in another second frame sub-sub-period SFL12 explained earlier, as shown in FIGS. 11A to 11C, the video-image signal processing section 41 makes use of the replacement-value LUT to replace the luminance gradation of the video-image signal D1 (or, to be more specific, the left-eye video-image signal L1) serving as the immediately preceding video-image signal D2 to be newly stored in the frame memory 42 in order to generate a video-image signal D2 (or, to be more specific, the left-eye video-image signal L1') which is the post-replacement video-image signal D2 cited above. Then, the video-image signal processing section 41 stores the post-replacement video-image signal D2 in the frame memory 42.

In the same way, in a further second frame sub-sub-period SFR12 explained earlier, as shown in FIGS. 11A to 11C, the video-image signal processing section 41 makes use of the replacement-value LUT to replace the luminance gradation of the video-image signal D1 (or, to be more specific, the right-eye video-image signal R1) serving as the immediately preceding video-image signal D2 to be newly stored in the frame memory 42 in order to generate a video-image signal D2 (or, to be more specific, the right-eye video-image signal R1') which is the post-replacement video-image signal D2 cited above. Then, the video-image signal processing section 41 stores the post-replacement video-image signal D2 in the frame memory 42.

Figures 12, 13:
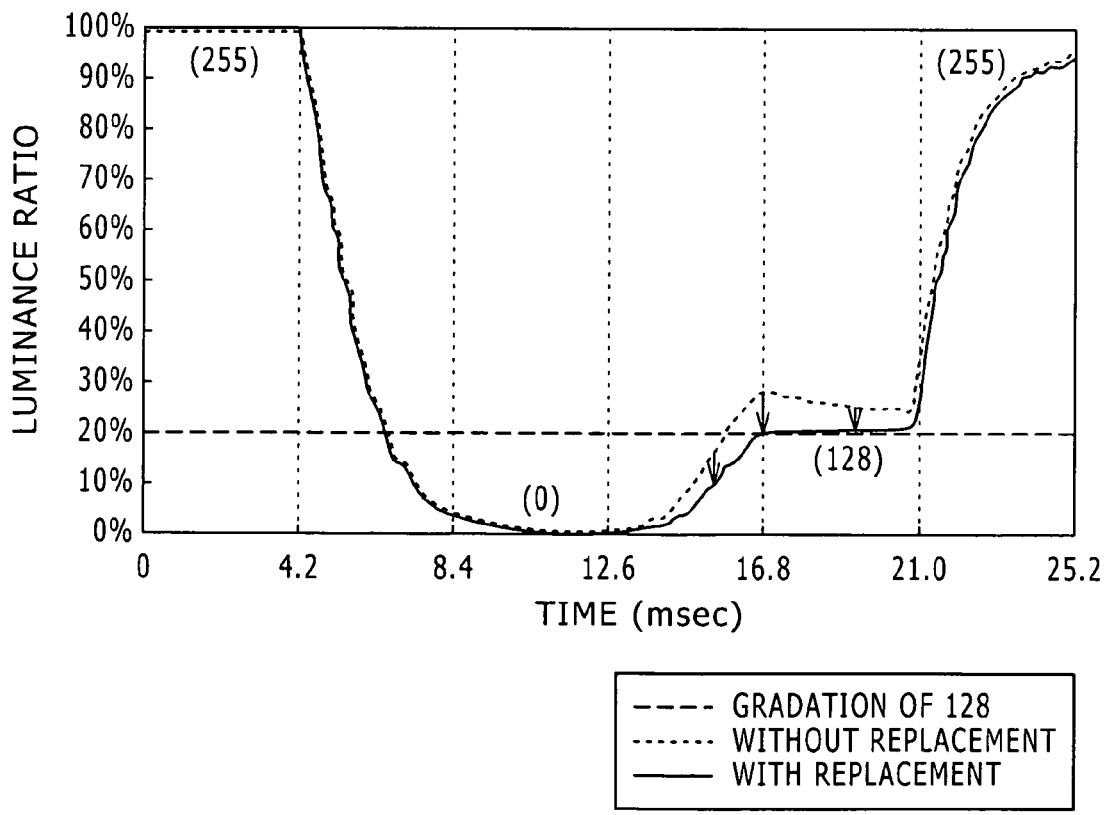
FIG. 12 is a diagram showing a typical replacement-value lookup table used in the second embodiment.
FIG. 13 is a timing diagram showing a typical response characteristic of the display luminance in the course of execution of the overdrive processing shown in FIGS. 11A to 11C.

FIG. 12 is a diagram showing a typical replacement-value lookup table LUT0 used in the second embodiment to replace the luminance gradation of the immediately preceding video-image signal D2 before the immediately preceding video-image signal D2 is stored in the frame memory 42. In the table shown in FIG. 12, for the sake of clarity, reference notation D1 denotes the new immediately preceding video-image signal D2 to be newly stored in the frame memory 42, reference notation D2 at the top denotes the immediately preceding video-image signal D2 stored so far in the frame memory 42 whereas reference notation D2 on the right side denotes the new immediately preceding video-image signal D2 having its luminance gradation already replaced with a new one. Thus, reference notation D1 used in the descriptions of the second embodiment and a second modified version to be explained later denotes a new immediately preceding video-image signal D2 to be newly stored in the frame memory 42.

That is to say, the luminance gradations on the leftmost column of the replacement-value lookup table LUT0 shown in FIG. 12 are the luminance gradations of the immediately preceding video-image signal D2 to be newly stored in the frame memory 42 whereas the luminance gradations on the uppermost row of the replacement-value lookup table LUT0 are the original (pre-replacement) luminance gradations of the immediately preceding video-image signal D2 stored so far in the frame memory 42. The replacement-value lookup table LUT0 prescribes replacement values for different original (pre-replacement) luminance gradations of the pre-replacement video-image signal D2 to be newly stored in the frame memory and different luminance gradations of the immediately preceding video-image signal D2 stored so far in the frame memory 42. Each of the replacement values prescribed by the replacement-value lookup table LUT0 is used as a luminance gradation for replacing the luminance gradation of the immediately preceding video-image signal D2 in the process to replace a luminance gradation so as to generate a post-replacement video-image signal D2 having the replacement value as the luminance gradation thereof. The post-replacement video-image signal D2 having the replacement value as the luminance gradation thereof is then stored in the frame memory 42 to replace the pre-replacement video-image signal D2 which has been existing in the frame memory 42 so far.

It is to be noted that the luminance gradation of each of the immediately preceding video-image signal D2 stored so far in the frame memory 42 and the post-replacement video-image signal D2 newly stored in the frame memory 42 has a value in a typical range of 0 to 255. In addition, the replacement-value lookup table LUT0 is shown as an LUT which prescribes only some representative replacement values each used as a replacement gradation. The following description also assumes such a typical range of the luminance gradations and the fact that the replacement-value lookup table LUT0 prescribes only some representative luminance gradations.

In addition, in order to make the replacement-value lookup table LUT0 compatible with gradation transitions in a range determined in advance, each of the replacement values is set at a selected value in the replacement-value lookup table LUT0. In this case, a first gradation transition in the range determined in advance is a transition from a high luminance gradation of the pre-replacement video-image signal D2 stored in the frame memory 42 so far to a low luminance gradation of the post-replacement video-image signal D2 to be newly stored in the frame memory whereas a second gradation transition in the range determined in advance is a transition from a low luminance gradation of the pre-replacement video-image signal D2 stored in the frame memory 42 so far to a medium luminance gradation of the post-replacement video-image signal D2 to be newly stored in the frame memory. The pre-replacement video-image signal D2 to be newly stored in the frame memory is denoted by reference notation D1 in the replacement-value lookup table LUT0 shown in FIG. 12.

FIG. 13 is a diagram showing a typical response characteristic of the display luminance in the course of execution of the overdrive processing shown in FIGS. 11A to 11C. The display luminance is the luminance exhibited by the liquid-crystal device 22 due to application of a video-image voltage to the pixel 20 employing the liquid-crystal device 22. A dotted-line curve shown in FIG. 13 for a purpose of comparison represents overdrive processing according to the first embodiment in which the luminance gradation of the immediately preceding video-image signal D2 is not replaced with a replacement value before the immediately preceding video-image signal D2 is stored in the frame memory 42. On the other hand, a solid-line curve in the diagram of FIG. 13 represents overdrive processing according to the second embodiment in which the luminance gradation of the immediately preceding video-image signal D2 is replaced with a replacement value before the immediately preceding video-image signal D2 is stored in the frame memory 42.

For the curves shown in FIG. 13, each of the right-eye video-image signal DR and the left-eye video-image signal DL which are included in the current video-image signal D1 is written two times in a row in two consecutive write operations during two successive frame sub-sub-periods respectively. In each of the two consecutive operations to write each of the right-eye video-image signal DR and the left-eye video-image signal DL, the display-luminance gradation makes the following transitions: gradation of 255→gradation of 255→gradation of 0→gradation of 0→gradation of 128→gradation of 128→gradation of 255→gradation of 255. Each number enclosed in parentheses shown in the diagrams of FIGS. 11A to 11C and FIG. 13 is the value of a luminance gradation.

In the case of the overdrive processing carried out without replacing the luminance gradation of the immediately preceding video-image signal D2 before the immediately preceding video-image signal D2 is stored in the frame memory 42, each of gradation transitions from a gradation of 255 in the second frame sub-sub-period SFR02 to a gradation of 0 in the first and second frame sub-sub-periods SFL11 and SFL12 is a transition from a high gradation to a low gradation. Thus, the state of the liquid-crystal device 22 cannot completely attain the gradation of 0 after each of the transitions. Then, in each of subsequent gradation transitions from a gradation of 0 in the first and second frame sub-sub-periods SFL11 and SFL12 to a gradation of 128 in the first and second frame sub-sub-periods SFR11 and SFR12, in the case of the overdrive processing without replacing the luminance gradation of the immediately preceding video-image signal D2 before the immediately preceding video-image signal D2 is stored in the frame memory 42, excessive overdrive processing for each of the gradation transitions from a gradation of 0 to a gradation of 128 is carried out. Thus, as indicated by the dotted-line curve shown in FIG. 13 to represent the response characteristic of the display luminance, a shift from the target luminance which is the gradation of 128 in this case is left to a certain degree as before.

In the case of the overdrive processing carried out by replacing the luminance gradation of the immediately preceding video-image signal D2 before the immediately preceding video-image signal D2 is stored in the frame memory 42, on the other hand, as indicated by reference notation P4 shown in FIG. 12 and as shown in FIGS. 11A to 11C, in each of the gradation transitions from a gradation of 0 in the first and second frame sub-sub-periods SFL11 and SFL12 to a gradation of 128 in the first and second frame sub-sub-periods SFR11 and SFR12, a process to replace the luminance gradation of a new immediately preceding video-image signal D2 before the new immediately preceding video-image signal D2 is stored in the frame memory 42 is carried out on the basis of the replacement luminance gradation of an old immediately preceding video-image signal D2 already stored in the frame memory 42 and the replacement luminance gradation of the new immediately preceding video-image signal D2 to be newly stored in the frame memory 42 as follows. In the table shown in FIG. 12, for the sake of clarity, reference notation D1 denotes the new immediately preceding video-image signal D2 to be newly stored in the frame memory 42, reference notation D2 at the top denotes the old immediately preceding video-image signal D2 stored so far in the frame memory 42 whereas reference notation D2 on the right side denotes the new immediately preceding video-image signal D2 having its luminance gradation already replaced with a new one. Thus, reference notation D1 used in the descriptions of the second embodiment and a second modified version to be explained later denotes a new immediately preceding video-image signal D2 to be newly stored in the frame memory 42. The video-image signal processing section 41 changes the luminance gradation of the current video-image signal D1 (or, to be more specific, a left-eye video image L1 of the current video-image signal D1) from a gradation of 0 to a gradation of 28 in order to generate a post-replacement video-image signal D2 (or, to be specific, a left-eye video image L1' of the video-image signal D2). Then, the video-image signal processing section 41 stores the left-eye video image L1' of the video-image signal D2 in the frame memory 42. Thus, in the gradation transition from a gradation of 0 to a gradation of 128, the overdrive processing section carries out overdrive processing corresponding to a transition of the luminance gradation to the gradation of 128 from the gradation of 28 instead of the gradation of 0. That is to say, the overdrive quantity is small in comparison with the overdrive processing carried out without replacing the luminance gradation of the immediately preceding video-image signal D2. As a result, as indicated by an arrow shown in FIG. 13, in the solid-line curve shown in FIG. 13 to represent the response characteristic of the display luminance, a shift from the target luminance which is the gradation of 128 in this case is small in comparison with the overdrive processing carried out without replacing the luminance gradation of the immediately preceding video-image signal D2. In addition, the scales of phenomena such as excessive compensation and tail dragging which occur in the operation to display a video image are small in comparison with the overdrive processing carried out without replacing the luminance gradation of the immediately preceding video-image signal D2.

As described above, in the case of the second embodiment, the video-image signal processing section 41 makes use of the replacement-value lookup table LUT0 shown in FIG. 12 in order to replace the luminance gradation of the input video-image signal Din handled as the video-image signal D1 with a replacement luminance gradation and the luminance gradation of the pre-replacement video-image signal D2. Then, the video-image signal processing section 41 stores a video-image signal having the replacement luminance gradation in the frame memory 42. Thus, in overdrive processing corresponding to a transition in the aforementioned range determined in advance, excessive overdrive processing can be avoided. As a result, it is possible to reduce the scales of the phenomena such as excessive compensation and tail dragging which occur in the operation to display a video image by adoption of the time-division driving method. In addition, the quality of a displayed moving image can be improved.

To put it more concretely, in order to make the replacement-value lookup table LUT0 compatible with gradation transitions in a range determined in advance, each of the replacement values is set at a selected value in the replacement-value lookup table LUT0. In this case, a first gradation transition in the range determined in advance is a transition from a high luminance gradation of the pre-replacement video-image signal D2 stored so far in the frame memory 42 to a low luminance gradation of the video-image signal D1 serving as the post-replacement video-image signal D2 to be newly stored in the frame memory whereas a second gradation transition in the range determined in advance is a transition from a low luminance gradation of the pre-replacement video-image signal D2 stored so far in the frame memory 42 to a medium luminance gradation of the video-image signal D1 serving as the post-replacement video-image signal D2 to be newly stored in the frame memory.

3: Modified Versions

Next, some modified versions of the present invention are explained. It is to be noted that components employed in each of the modified versions to serve as components identical with their respective counterparts included in the first and second embodiments are denoted by the same reference numerals or the same reference notations as the counterparts. In addition, the identical components are not explained again in order to avoid duplications of explanations unless descriptions of the identical components are absolutely required.

3-1: First and Second Modified Versions

FIGS. 14A to 14C are timing diagrams referred to in explanation of overdrive processing carried out by a first modified version of the present invention. To be more specific, FIG. 14A is a timing diagram of a current video-image signal D1, FIG. 14B is a timing diagram of an immediately preceding video-image signal D2 whereas FIG. 14C is a timing diagram of a newly generated video-image signal D3.

On the other hand, FIGS. 15A to 15C are timing diagrams referred to in explanation of overdrive processing carried out by a second modified version of the present invention. To be more specific, FIG. 15A is a timing diagram of a current video-image signal D1, FIG. 15B is a timing diagram of an immediately preceding video-image signal D2 whereas FIG. 15C is a timing diagram of a newly generated video-image signal D3.

It is to be noted that the first modified version to be explained by referring to FIGS. 14A to 14C is obtained by modifying the first embodiment whereas the second modified version to be explained by referring to FIGS. 15A to 15C is obtained by modifying the second embodiment.

As shown in FIGS. 14A to 14C and FIGS. 15A to 15C, in each of the first and second modified versions, during the L frame sub-period of each frame period, a left-eye video-image signal is written into the liquid-crystal display panel 2 three times in a row in three consecutive write operations during three consecutive frame sub-sub-periods respectively in order to display left-eye video images L1, L2 and so on. By the same token, during the R frame sub-period of each frame period, a right-eye video-image signal is written into the liquid-crystal display panel 2 three times in a row in three consecutive write operations during three consecutive frame sub-sub-periods respectively in order to display right-eye video images R0, R1 and so on. That is to say, in one frame period, for example, video images are consecutively displayed on the liquid-crystal display panel 2 in the following order: left-eye video image L1→left-eye video image L1→left-eye video image L1→right-eye video image R1→right-eye video image R1→right-eye video image R1. Then, after the third one of the three consecutive write operations to write the left-eye video image L1 at the end of the L frame sub-period is completed and the liquid-crystal device 22 has responded sufficiently to the third write operation, the left-eye lens 6L employed in the shutter glasses 6 put in an open state. By the same token, after the third one of the three consecutive write operations to write the right-eye video image R1 at the end of the R frame sub-period is completed and the liquid-crystal device 22 has responded sufficiently to the third write operation, the right-eye lens 6R employed in the shutter glasses 6 put in an open state.

In each of the first and second modified versions, if the current frame sub-period is an L frame sub-period for example, overdrive processing is carried out by making use of the luminance gradation of the right-eye video signal DR appearing in an R frame sub-period immediately leading ahead of the current L frame sub-period as a luminance gradation common to the three consecutive write operations carried out during the current L frame sub-period. By the same token, if the current frame sub-period is an R frame sub-period, on the other hand, overdrive processing is carried out by making use of the luminance gradation of the left-eye video signal DL appearing in an L frame sub-period immediately leading ahead of the current R frame sub-period as a luminance gradation common to the three consecutive write operations carried out during the current R frame sub-period.

The overdrive processing cited above is carried out in the overdrive processing section 44 by making use of three different lookup tables OD LUT1 to OD LUT3 each shown in the diagrams of FIGS. 14A to 14C and FIGS. 15A to 15C to serve as a lookup table used for prescribing overdrive quantities. To be more specific, in the first one of the three consecutive frame sub-sub-periods to output (write) a particular video-image signal included in the current video-image signal D1, the overdrive processing is carried out by making use of the first lookup table OD LUT1 in order to generate a video-image signal D3 such an $L1_{OD1}$ shown in each of the diagrams of FIGS. 14A to 14C and FIGS. 15A to 15C. In the second one of the three consecutive frame sub-sub-periods to output (write) the same particular video-image signal, the overdrive processing is carried out by making use of the second lookup table OD LUT2 used for prescribing overdrive quantities different from overdrive quantities prescribed by the first lookup table OD LUT1 in order to generate a video-image signal D3 such an $L1_{OD2}$ shown in FIGS. 14A to 14C and FIGS. 15A to 15C. In the third one of the three consecutive frame sub-sub-periods to output (write) the same particular video-image signal, the overdrive processing is carried out by making use of the third lookup table OD LUT3 used for prescribing overdrive quantities different from overdrive quantities prescribed by the first lookup table OD LUT1 and different from overdrive quantities prescribed by the second lookup table OD LUT2 in order to generate a video-image signal D3 such an $L1_{OD3}$ shown in FIGS. 14A to 14C and FIGS. 15A to 15C.

It is to be noted that the third lookup table OD LUT3 used in the third one of the three consecutive frame sub-sub-periods to output or write the same particular video-image signal is a lookup table for fine adjustment such as a process of compensating for a swing-over phenomenon as is the case with the second lookup table LUT2 shown in FIG. 3B to serve as a lookup table used in a second frame sub-sub-period in the case of the first embodiment.

In the second modified version explained below by referring to FIGS. 15A to 15C, in the same way as the second embodiment, the video-image signal processing section 41 replaces the luminance gradation of the video-image signal D1 with a replacement value in order to generate a post-replacement video-image signal D2 having the replacement value as the luminance gradation thereof. Then, the video-image signal processing section 41 stores the post-replacement video-image signal D2 in the frame memory 42. To put it more concretely, for example, in a third frame sub-sub-period SFR03, the video-image signal processing section 41 refers to the replacement-value lookup table LUT to find a replacement value to be used for replacing the luminance gradation of the right-eye video-image signal R0 of a video-image signal D1 in order to generate a right-eye video image R0' which serves as the post-replacement video-image signal D2. Then, the video-image signal processing section 41 stores the post-replacement video-image signal D2 in the frame memory 42. By the same token, in a third frame sub-sub-period SFL13, the video-image signal processing section 41 refers to the replacement-value lookup table LUT to find a replacement value to be used for replacing the luminance gradation of the left-eye video-image signal L1 of a video-image signal D1 in order to generate a left-eye video image L1' which serves as the post-replacement video-image signal D2. Then, the video-image signal processing section 41 stores the post-replacement video-image signal D2 in the frame memory 42.

As described above, the first and second modified versions carry out operations similar to those carried out by the first and second embodiments respectively in order to produce the same effects. That is to say, during one of frame sub-periods of each frame period, a video-image signal may be written into the liquid-crystal display panel 2 three times in a row in at least three consecutive frame sub-sub-periods in order to display video images represented by the video-image signal. Even in such a configuration, it is possible to produce the same effects as those as the first and second embodiments.

3-2: Third Modified Version

Figure 16A:
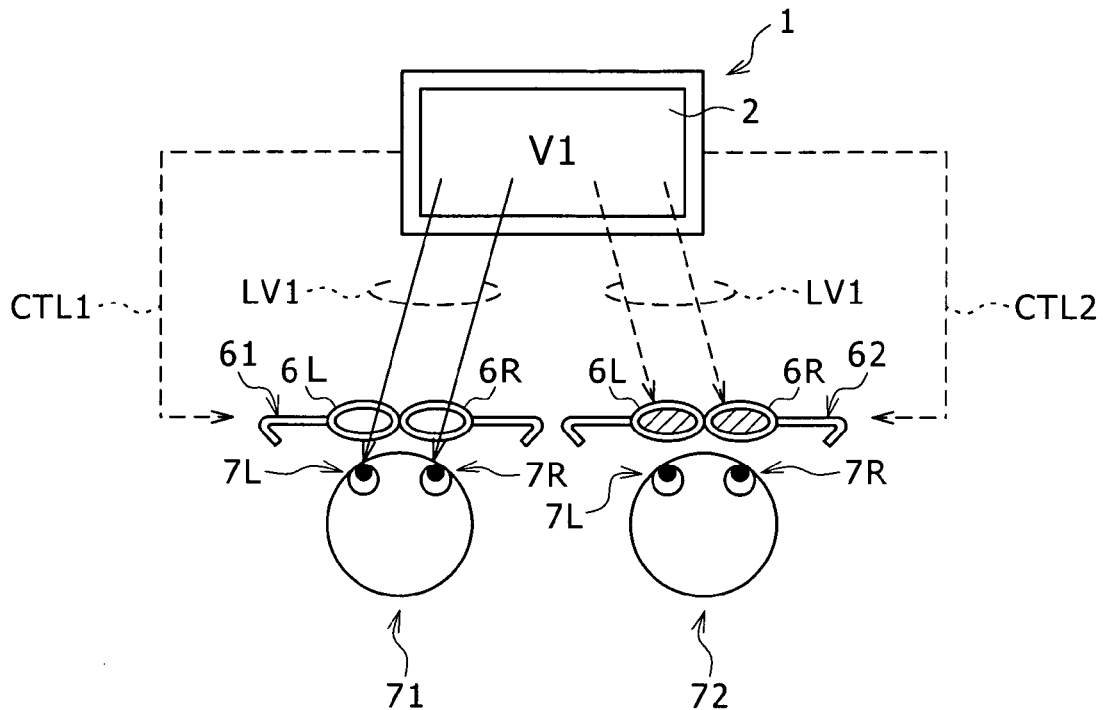
FIGS. 16A and 16B are model diagrams each to be referred to in explanation of an outline of an operation carried out by a video-image display system according to a third modified version of the present invention to display a 3D video image.
Figure 16B:
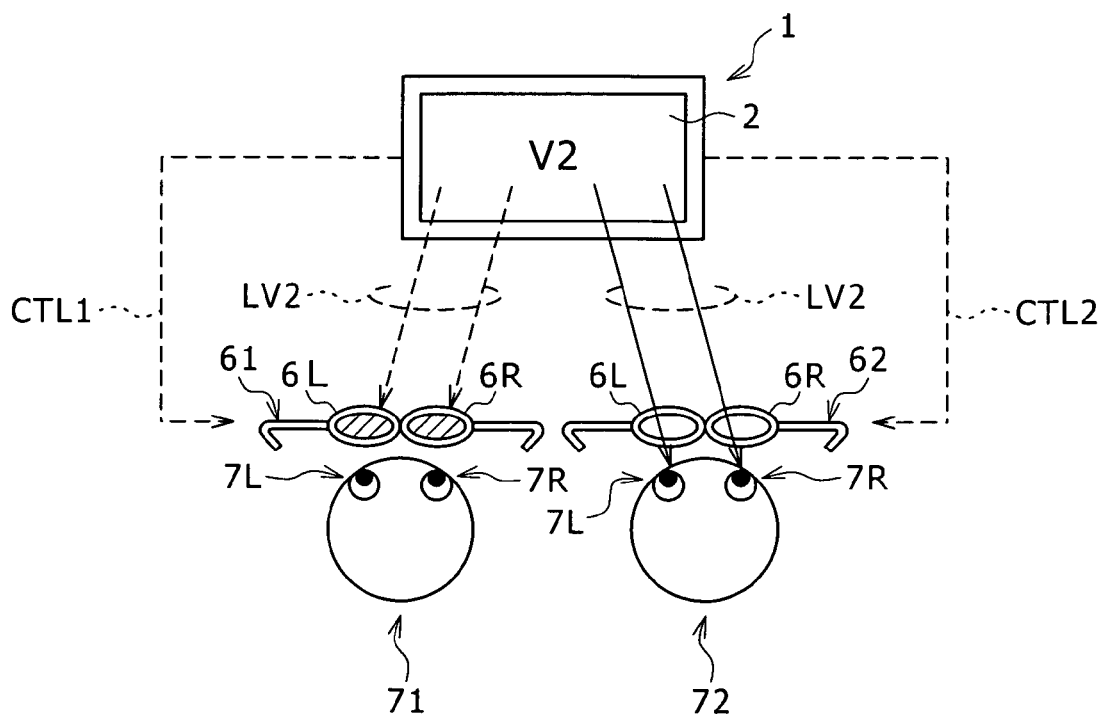

FIGS. 16A and 16B are model diagrams each referred to in explanation of an outline of an operation carried out by a video-image display system according to a third modified version of the present invention to display a 3D video image. The video-image display system according to the third modified version is referred to as a multi-view system.

The third modified version implements a video-image display system which is capable of carrying out a multi-image display operation in place of the 3D image display operation carried out by the first and second embodiments as well as the first and second modified versions as explained so far. In the multi-image display operation, a plurality of video images different from each other are displayed individually to a plurality of viewers which are each also referred to as a user. In the case of the third modified version, two video images different from each other are displayed individually to two viewers respectively.

In the multi-view system according to the third modified version, a first video image based on a first video-image signal for the first viewer and a second video image based on a second video-image signal for the second viewer are displayed alternately on a time-division basis. In the case of the first and second embodiments, as explained so far, a left-eye video image is displayed to the right-eye lens 6R employed in the shutter glasses 6 whereas a left-eye video image is displayed to the right-eye lens 6R and the video images are alternately on a time-division basis. In the case of the multi-view system according to the third modified version, on the other hand, first and second video images for first and second viewers respectively are displayed alternately on a time-division basis.

To put it more concretely, as shown in FIG. 16A, a first control signal CTL1 sustains the light shielding functions of both the left-eye lens 6L and the right-eye lens 6R which are employed in first shutter glasses 61 worn by a first viewer 71 in an ineffective state while the first 3D video image V1 is being displayed. On the other hand, a second control signal CTL2 sustains the light shielding functions of both the left-eye lens 6L and the right-eye lens 6R which are employed in second shutter glasses 62 worn by a second viewer 72 in an effective state while the first 3D video image V1 is being displayed. That is to say, the first shutter glasses 61 worn by the first viewer 71 are put in a state of being open to transmission of display light LV1 which emanates from the displayed first 3D video image V1. On the other hand, the second shutter glasses 62 worn by the second viewer 72 are put in a state of being close to the transmission of the display light LV1.

As shown in FIG. 16B, on the other hand, a first control signal CTL1 sustains the light shielding functions of both the left-eye lens 6L and the right-eye lens 6R which are employed in first shutter glasses 61 worn by the first viewer 71 in an effective state while the second 3D video image V2 is being displayed. On the other hand, a second control signal CTL2 sustains the light shielding functions of both the left-eye lens 6L and the right-eye lens 6R which are employed in second shutter glasses 62 worn by the second viewer 72 in an ineffective state while the first 3D video image V2 is being displayed. That is to say, the first shutter glasses 61 worn by the first viewer 71 are put in a state of being close to transmission of display light LV2 which emanates from the displayed first 3D video image V2. On the other hand, the second shutter glasses 62 worn by the second viewer 72 are put in a state of being open to the transmission of the display light LV2.

The state shown in FIG. 16A and the state shown in FIG. 16B are established repeatedly as well as alternately on a time-division basis so that the first 3D video image V1 and the second 3D video image V2 which are different from each other are displayed individually to the two viewers 71 and 72 respectively in the so-called multi-view mode.

It is also possible to apply the OD processing explained in the descriptions of the first and second embodiments as well as the first and second modified versions to the multi-image display operation carried out by the third modified version as described above. Thus, it is possible to obtain the same effects as those produced by the first and second embodiments as well as the first and second modified versions.

As described above, in the case of the multi-view system according to the third modified version, first and second video images different from each other are displayed alternately on a time-division basis as well as individually to the first and second viewers respectively. It is to be noted that the present invention can also be applied to a case in which three or more video images different from each other are displayed individually to three or more viewers in the same way. In addition, the number of video images different from each other does not have to be equal to the number of shutter-spectacle sets each worn by a viewer. That is to say, a plurality of shutter-spectacle sets each put in an open or close state can be provided for one video image so that the video image can be viewed by the same plurality of viewers each wearing one of the shutter-spectacle sets.

3-3: Other Modified Versions

Each of the first and second embodiments as well as the first to third modified versions has been explained as a typical implementation of the present invention. However, implementations of the present invention are by no means limited to the first and second embodiments or the first to third modified versions. That is to say, each of the first and second embodiments as well as the first to third modified versions can be further modified in order to implement the present invention.

In addition, it should be understood by those skilled in the art that a variety of modifications, combinations, sub-combinations and alterations may occur, depending on design requirements and other factors as far as they are within the scope of the appended claims or the equivalents thereof.

For example, as described above, each of the first and second embodiments as well as the first to third modified versions implements a 3D video-image display system which makes use of shutter glasses to serve as a typical time-division driving system. However, the present invention can also be applied to a color video-image display apparatus/system which adopts typically the field sequential method. In the color video-image display apparatus/system adopting the field sequential method, one frame period is divided into 3 sub-periods allocated to typically the three primary colors, i.e., the R (red), G (green) and B (blue) colors respectively. Video images of the R, G and B colors are written into the display screen sequentially during their respective sub-periods. In addition, a backlight radiates R, G and B light rays synchronously with the operations to write the video images of the R, G and B colors respectively into the display screen. That is to say, in the case of the first and second embodiments or the first to third modified versions, a plurality of video images different from each other are a left-eye video image and a right-eye video image which have a disparity but, in the case of this color video-image display apparatus/system adopting the field sequential method, a plurality of video images different from each other are three video images of the R, G and B colors.

In addition, as described above, each of the first and second embodiments as well as the first to third modified versions implements a typical liquid-crystal display apparatus which employs a liquid-crystal display panel configured to include liquid-crystal devices. However, the present invention can also be applied to a display apparatus of another kind. To put it more concretely, for example, the present invention can also be applied to a display apparatus employing a PDP (Plasma Display Panel) and a display apparatus employing an EL (Electro Luminescence) display panel.

The series of processes described previously in the explanation of each of the first and second embodiments as well as a variety of modified versions described so far can be carried out by hardware and/or execution of software. If the series of processes described above is carried out by execution of software, programs composing the software can be installed into a general computer or the like. As an alternative, such programs can also be stored in advance in a storage medium embedded in the general computer.

What is claimed is:

1. A video-image processing apparatus comprising:
  a video-image processing section configured to execute output control on a plurality of video-image streams each including a plurality of unitary video images appearing along the time axis so as to output every unitary video image pertaining to each of said video-image streams repeatedly a plurality of times in a row by sequentially switching said video-image streams to be output from one stream to another on a time-division basis;
  a frame memory for temporarily storing an immediately preceding unitary video image as it is or after replacing the luminance gradation of said immediately preceding unitary video image with a post-replacement luminance gradation where said immediately preceding unitary video image is defined as a unitary video image which immediately leads ahead of a current unitary video image being output by said video-image processing section and is selected among unitary video images pertaining to a video-image stream other than and different from a video-image stream including said current unitary video image; and
  an overdrive processing section configured to carry out overdrive processing on said current unitary video image in accordance with said luminance gradation of said immediately preceding unitary video image already stored in said frame memory and the luminance gradation of said current unitary video image,
  wherein a unitary video image pertaining to each of said video-image streams is output repeatedly a plurality of times in a row in the same plurality of output operations; in said overdrive processing carried out on said current unitary video image output in any one of said output operations, said overdrive processing section refers to a lookup table used for prescribing an overdrive quantity set for said current unitary video image in accordance with the luminance gradation of said immediately preceding unitary video image and the luminance gradation of said current unitary video image; and a lookup table referred to in any specific one of said output operations is different from a lookup table referred to in any output operation other than said specific output operation, and wherein for each unitary video image the unitary video image is output a plurality of times in a row during a predetermined period, the outputs of the unitary video image during the predetermined period correspond to respective subperiods, and a plurality of lookup tables are provided for respective ones of the subperiods, the plurality of lookup tables varying from sub-period to sub-period.

2. The video-image processing apparatus according to claim 1 wherein:

said lookup tables different from each other include a first lookup table to be referred to in a first one of said output operations and a second lookup table to be referred to in a second and subsequent ones of said output operations;

each of said overdrive quantities prescribed by said first lookup table is set in said first lookup table at a value which increases a difference in luminance gradation between said immediately preceding unitary video image and said current unitary video image; and each of said overdrive quantities prescribed by said second lookup table is set in said second lookup table at a value used in fine adjustment carried out after said overdrive processing performed for said first output operation to sustain the luminance gradation of said current unitary video image at the gradation of said target luminance or to make the luminance gradation of said current unitary video image equal to the gradation of said target luminance.

3. The video-image processing apparatus according to claim 1 wherein said video-image processing section replaces the luminance gradation of said immediately preceding unitary video image with said post-replacement luminance gradation in order to generate a replacement unitary video image and stores said replacement unitary video image in said frame memory.

4. The video-image processing apparatus according to claim 3 wherein said post-replacement luminance gradation used by said video-image processing section to replace the luminance gradation of said immediately preceding unitary video image in order to generate a replacement unitary video image to be newly stored in said frame memory is prescribed by a replacement-value lookup table to be searched by said video-image processing section for said post-replacement luminance gradation set in said replacement-value lookup table at a replacement value depending on the luminance gradation of said immediately preceding unitary video image and the luminance gradation of a previous unitary video image which has been stored in said frame memory at a time said immediately preceding unitary video image is processed by said video-image processing section.

5. The video-image processing apparatus according to claim 4 wherein said replacement-value lookup table prescribes said replacement values each used for making a gradation transition from a high luminance gradation of said previous unitary video image already stored in said frame memory to a low luminance gradation of said immediately preceding unitary video image or a gradation transition from a low luminance gradation of said previous unitary video image already stored in said frame memory to a medium luminance gradation of said immediately preceding unitary video image.

6. The video-image processing apparatus according to claim 1 wherein said video-image processing section stores said immediately preceding unitary video image in said frame memory as it is.

7. The video-image processing apparatus according to claim 1 wherein each of said video-image streams includes a left-eye video-image stream and a right-eye video-image stream which have a disparity between a video image based on said left-eye video-image stream and a video image based on said right-eye video-image stream.

8. A video-image display apparatus comprising:

a video-image processing section configured to execute output control on a plurality of video-image streams each including a plurality of unitary video images appearing along the time axis so as to output every unitary video image pertaining to each of said video-image streams repeatedly a plurality of times in a row by sequentially switching said video-image streams to be output from one stream to another on a time-division basis;

a frame memory for temporarily storing an immediately preceding unitary video image as it is or after replacing the luminance gradation of said immediately preceding unitary video image with a post-replacement luminance gradation where said immediately preceding unitary video image is defined as a unitary video image which immediately leads ahead of a current unitary video image being output by said video-image processing section and is selected among unitary video images pertaining to a video-image stream other than and different from a video-image stream including said current unitary video image;

an overdrive processing section configured to carry out overdrive processing on said current unitary video image in accordance with said luminance gradation of said immediately preceding unitary video image already stored in said frame memory and the luminance gradation of said current unitary video image; and a display section configured to display a video image on the basis of unitary video images obtained as a result of said overdrive processing, wherein a unitary video image pertaining to each of said video-image streams is output repeatedly a plurality of times in a row in the same plurality of output operations; in said overdrive processing carried out on said current unitary video image output in any one of said output operations, said overdrive processing section refers to a lookup table used for prescribing an overdrive quantity set for said current unitary video image in accordance with the luminance gradation of said immediately preceding unitary video image and the luminance gradation of said current unitary video image; and a lookup table referred to in any specific one of said output operations is different from a lookup table referred to in any output operation other than said specific output operation, and wherein for each unitary video image the unitary video image is output a plurality of times in a row during a predetermined period, the outputs of the unitary video image during the predetermined period correspond to respective subperiods, and a plurality of lookup tables are provided for respective ones of the subperiods, the plurality of lookup tables varying from sub-period to sub-period.

9. The video-image display apparatus according to claim 8 wherein said display section is a liquid-crystal display section configured to employ liquid-crystal devices.

10. A video-image display system comprising:
- a video-image display apparatus for displaying a video image by sequentially switching a plurality of video-image streams each including a plurality of unitary video images appearing along the time axis from one stream to another on a time-division basis; and
- shutter glasses carrying out opening and closing operations synchronously with operations performed by said video-image display apparatus to sequentially switch said video-image streams in order to display said video image,
- wherein said video-image display apparatus includes a video-image processing section configured to execute output control on a plurality of video-image streams each including a plurality of unitary video images appearing along the time axis so as to output every unitary video image pertaining to each of said video-image streams repeatedly a plurality of times in a row by sequentially switching said video-image streams to be output from one stream to another on a time-division basis;
- a frame memory for temporarily storing an immediately preceding unitary video image as it is or after replacing the luminance gradation of said immediately preceding unitary video image with a post-replacement luminance gradation where said immediately preceding unitary video image is defined as a unitary video image which immediately leads ahead of a current unitary video image being output by said video-image processing section and is selected among unitary video images pertaining to a video-image stream other than and different from a video-image stream including said current unitary video image;
- an overdrive processing section configured to carry out overdrive processing on said current unitary video image in accordance with said luminance gradation of said immediately preceding unitary video image already stored in said frame memory and the luminance gradation of said current unitary video image; and
- a display section configured to display a video image on the basis of unitary video images obtained as a result of said overdrive processing,
- wherein a unitary video image pertaining to each of said video-image streams is output repeatedly a plurality of times in a row in the same plurality of output operations; in said overdrive processing carried out on said current unitary video image output in any one of said output operations, said overdrive processing section refers to a lookup table used for prescribing an overdrive quantity set for said current unitary video image in accordance with the luminance gradation of said immediately preceding unitary video image and the luminance gradation of said current unitary video image; and a lookup table referred to in any specific one of said output operations is different from a lookup table referred to in any output operation other than said specific output operation, and
- wherein for each unitary video image the unitary video image is output a plurality of times in a row during a predetermined period, the outputs of the unitary video image during the predetermined period correspond to respective subperiods, and a plurality of lookup tables are provided for respective ones of the subperiods, the plurality of lookup tables varying from sub-period to sub-period.

* * * * *